United States Patent
Kieser et al.

(10) Patent No.: US 12,286,142 B2
(45) Date of Patent: Apr. 29, 2025

(54) UTILITY BODY FOR HOUSING SYSTEM FOR DETECTING DEFECTS IN RAIL

(71) Applicant: Herzog Services, Inc., St. Joseph, MO (US)

(72) Inventors: John W. Kieser, Platte City, MO (US); Brent T. Applebury, St. Joseph, MO (US); Andy White, Savannah, MO (US)

(73) Assignee: Herzog Services, Inc., St. Joseph, MO (US)

( * ) Notice: Subject to any disclaimer, the term of this patent is extended or adjusted under 35 U.S.C. 154(b) by 0 days.

(21) Appl. No.: 18/632,172

(22) Filed: Apr. 10, 2024

(65) Prior Publication Data

US 2024/0253676 A1    Aug. 1, 2024

Related U.S. Application Data

(63) Continuation-in-part of application No. 18/355,392, filed on Jul. 19, 2023.
(Continued)

(51) Int. Cl.
*B61K 9/08* (2006.01)
*G01N 29/22* (2006.01)
*G03B 17/56* (2021.01)

(52) U.S. Cl.
CPC ............ *B61K 9/08* (2013.01); *G01N 29/225* (2013.01); *G03B 17/561* (2013.01)

(58) Field of Classification Search
USPC ...................................................... 73/866.5
See application file for complete search history.

(56) References Cited

U.S. PATENT DOCUMENTS 665,465 A    1/1901  Prentice
2,062,801 A  12/1936 Augustin
(Continued)

FOREIGN PATENT DOCUMENTS

CN    111337574 A    6/2020
CN    111547086 A    8/2020
(Continued)

OTHER PUBLICATIONS

Sperry Rail Service, Sperry B-Scan Dual Rail Inspection System; pp. 1-4; published prior to Nov. 26, 2014.
(Continued)

*Primary Examiner* — Clayton E. LaBalle
*Assistant Examiner* — Warren K Fenwick
(74) *Attorney, Agent, or Firm* — AVEK IP, LLC; Kent R. Erickson

(57) ABSTRACT

An equipment housing assembly removably securable to a hi-rail vehicle operable to advance along first and second rails of a railroad track includes a housing that houses and/or supports at least one rail sensor. The at least one rail sensor is operable to sense at least one property of at least one of the first and second rails as the hi-rail vehicle advances along the first and second rails. The at least one rail sensor is advanceable from a retracted configuration relative to the equipment housing to a deployed configuration relative to the equipment housing to sense the at least one property of at least one of the first and second rails. A power distribution system is removably and electrically connectable to a power source in the hi-rail vehicle. A control system is communicatively coupled the at least one sensor to control operation thereof and communicate sensor data therefrom.

21 Claims, 22 Drawing Sheets

Related U.S. Application Data

(60) Provisional application No. 63/495,152, filed on Apr. 10, 2023, provisional application No. 63/368,829, filed on Jul. 19, 2022.

(56) References Cited

U.S. PATENT DOCUMENTS

| | | | |
|---|---|---|---|
| 2,388,683 A | 11/1945 | Frickey et al. | |
| 2,978,904 A | 4/1961 | Bereznai | |
| 3,028,751 A * | 4/1962 | Joy | G01N 29/265 73/636 |
| 3,263,628 A | 8/1966 | Grove et al. | |
| 3,645,211 A | 2/1972 | Gretzschel et al. | |
| 4,044,594 A | 8/1977 | Owens et al. | |
| 4,075,888 A | 2/1978 | Buhler | |
| 4,391,134 A | 7/1983 | Theurer et al. | |
| 4,468,966 A | 9/1984 | Bradshaw | |
| 4,689,995 A * | 9/1987 | Turbe | G01N 29/265 73/636 |
| 5,660,115 A | 8/1997 | Shimon et al. | |
| 5,756,903 A | 5/1998 | Norby et al. | |
| 5,804,731 A * | 9/1998 | Jaeggi | G01N 29/28 73/620 |
| 5,970,438 A | 10/1999 | Clark et al. | |
| 6,476,603 B2 * | 11/2002 | Clark | B61D 15/00 324/217 |
| 6,516,668 B2 | 2/2003 | Havira et al. | |
| 6,600,999 B2 * | 7/2003 | Clark | B61D 15/00 702/35 |
| 6,981,419 B1 | 1/2006 | Hay et al. | |
| 6,988,451 B2 | 1/2006 | Marcotte et al. | |
| 7,107,669 B2 | 9/2006 | Tanaka et al. | |
| 7,201,106 B2 | 4/2007 | Whiston et al. | |
| 7,389,694 B1 | 6/2008 | Hay et al. | |
| 7,516,662 B2 | 4/2009 | Nielsen et al. | |
| 7,849,748 B2 | 12/2010 | Havira | |
| 7,882,742 B1 | 2/2011 | Martens | |
| 8,424,387 B2 | 4/2013 | Wigh et al. | |
| 8,820,166 B2 | 9/2014 | Wigh et al. | |
| 8,863,670 B2 | 10/2014 | Jackson | |
| 9,010,186 B2 | 4/2015 | Pagano | |
| 9,562,878 B2 | 2/2017 | Graham et al. | |
| 9,950,716 B2 | 4/2018 | English et al. | |
| 10,168,304 B2 | 1/2019 | Prince et al. | |
| 10,913,466 B2 * | 2/2021 | Kocur | B61D 15/12 |
| 10,989,692 B2 | 4/2021 | English et al. | |
| 11,169,269 B2 * | 11/2021 | Mesher | B61L 15/0054 |
| 11,590,992 B2 | 2/2023 | Kim et al. | |
| 11,782,160 B2 * | 10/2023 | Mesher | B61L 25/02 382/104 |
| 2001/0032513 A1 | 10/2001 | Havira et al. | |
| 2011/0209549 A1 * | 9/2011 | Kahn | G01N 29/265 73/636 |
| 2012/0218868 A1 | 8/2012 | Kahn et al. | |
| 2013/0231873 A1 * | 9/2013 | Fraser | B61K 5/00 702/35 |
| 2014/0069193 A1 | 3/2014 | Graham et al. | |
| 2014/0261067 A1 | 9/2014 | Davis | |
| 2020/0034637 A1 * | 1/2020 | Olson | G01C 21/165 |
| 2024/0025461 A1 * | 1/2024 | Roe | B61K 9/08 |

FOREIGN PATENT DOCUMENTS

| | | |
|---|---|---|
| CN | 212459523 U | 2/2021 |
| WO | 2022141370 A1 | 7/2022 |

OTHER PUBLICATIONS

Sperry Rail Service, Sperry Railbound Inspection Vehicles; pp. 1-8; published prior to Nov. 26, 2014.

Sperry Rail Service, The Sperry 450 Series Hi-Rail Detector Cars; pp. 1-4; published prior to Nov. 26, 2014.

Sperry Rail Service, The Sperry 7000 Series; pp. 1-6; published prior to Nov. 26, 2014.

Sperry Rail Service, The Sperry BSFD Trolley brochure; pp. 1-4; published prior to Nov. 26, 2014.

Sperry Rail Service; The Sperry 950 Series Hi-Rail Detector Cars; pp. 1-4; published prior to Nov. 26, 2014.

* cited by examiner

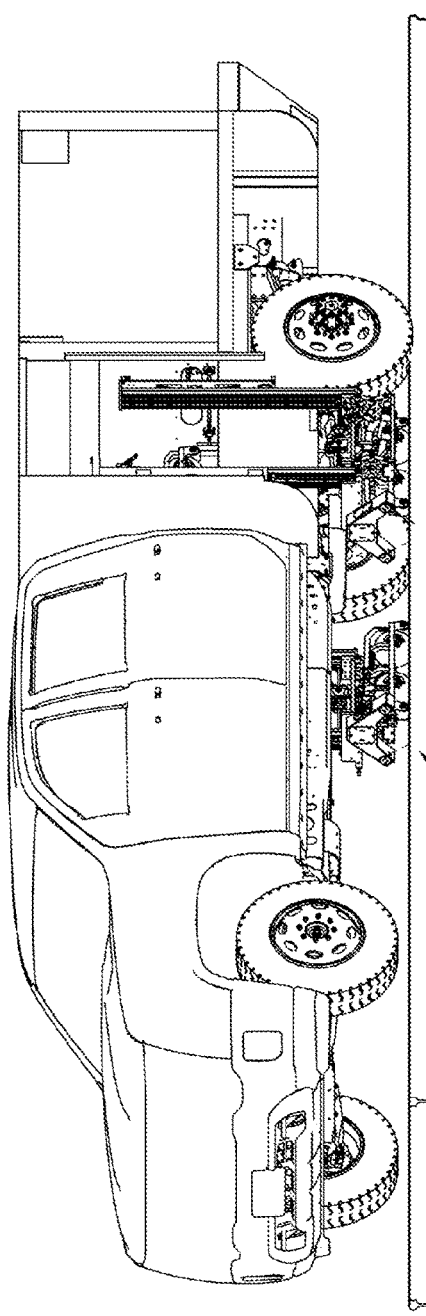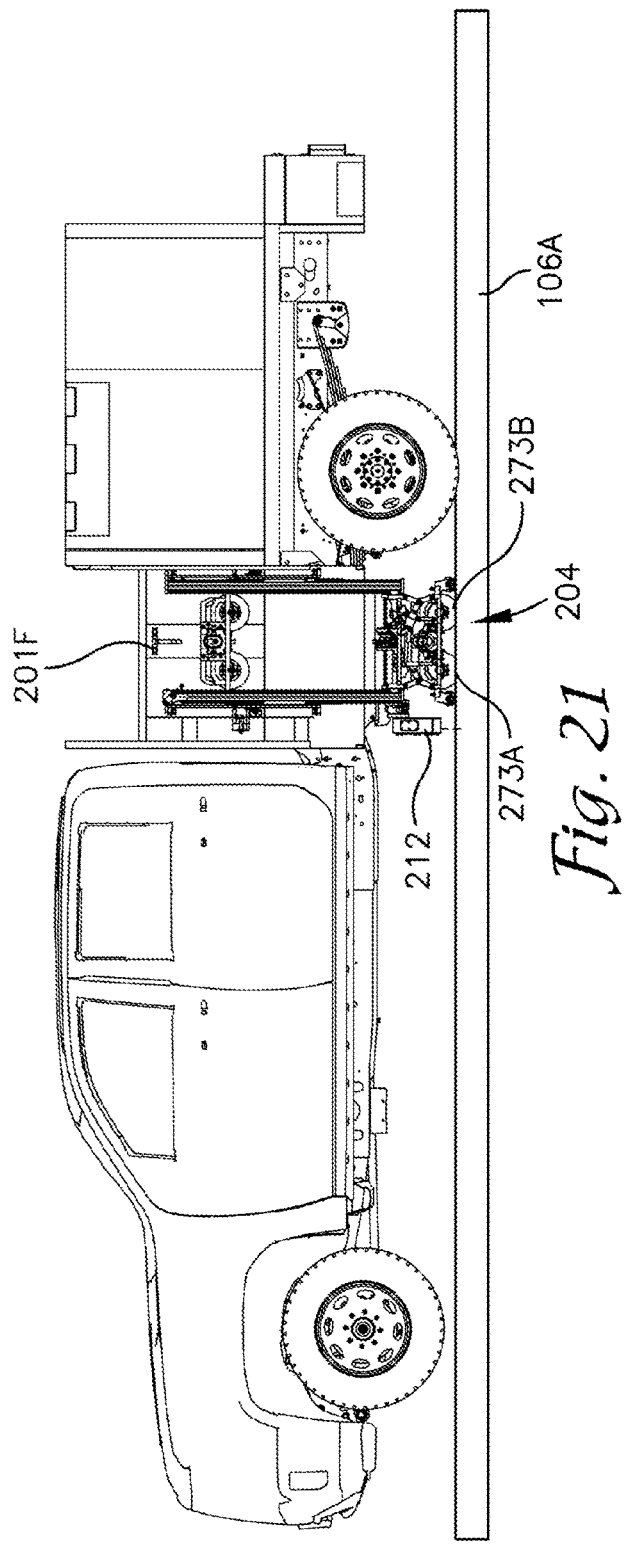

UTILITY BODY FOR HOUSING SYSTEM FOR DETECTING DEFECTS IN RAIL

CROSS-REFERENCE TO RELATED APPLICATION

This application claims the benefit of U.S. Provisional Patent Application Ser. No. 63/495,152, entitled Utility Box, filed Apr. 10, 2023. This application is also a continuation-in-part of U.S. patent application Ser. No. 18/355,392, filed Jul. 19, 2023 which claims the benefit of U.S. Provisional Patent Application Ser. No. 63/368,829, filed Jul. 19, 2022, the disclosures of all of which are incorporated by reference herein in their entirety.

BACKGROUND OF THE INVENTION

Field of the Invention

The disclosure relates generally to a utility body for housing a system for detecting defects in railway rails. More specifically, the disclosure relates to an equipment housing assembly securable to a hi-rail vehicle for housing and operation of an ultrasonic system and an imaging system for detecting defects in railway rails.

Background of the Invention

Rails of railway track systems incur damage as a matter of course. The damage may be caused, e.g., by harsh environmental conditions, heavy loads, and prolonged use. It is well documented that defects and fissures in rails result in numerous train accidents every year. It is prudent to timely detect and address such flaws.

Often flaws in the rails are not visible to the naked eye. Ultrasonic testing, therefore, has been employed to detect flaws and defects in rails. In the prior art, a hi-rail vehicle with flanged rail wheels carries an ultrasonic test unit or carriage along the rails. The carriage applies ultrasonic signals to the rails that provide indications of flaws and defects. The carriage contains roller search units ("RSUs"). Each RSU comprises an ultrasonic sensor system including a fluid-filled wheel and ultrasonic transducers. The fluid-filled wheel is typically formed of a pliant material that deforms to establish a contact surface when the wheel is pressed against the rail, and the ultrasonic transducers are configured and positioned for transmitting ultrasonic beams through the fluid in the wheel and through the contact surface into the rail and for receiving the reflected beams from the rail. One such RSU is described in U.S. Pat. No. 8,424,387, the disclosure of which is incorporated by reference herein in its entirety. The carriage has at least one RSU on both sides thereof so that the two rails can be tested simultaneously using the same carriage.

To ensure that flaws in the rail are appropriately detected using such ultrasonic testing, it is critical that the RSUs remain centered on the rails as the carriage is transported along the rail by the hi-rail vehicle. In the prior art, in addition to the hi-rail vehicle, the carriage transporting the RSUs includes one or more flanged wheels on both sides configured to ride over the rails. The flanged wheels serve to laterally steer and stabilize the carriage along the track. However, due to wear of the railhead (e.g., due to inconsistencies in the wear pattern of the railhead of the left rail relative to the railhead of the right rail), the flanged wheels of the carriage deviate from the center of the rails from time to time, thereby adversely impacting the RSU testing data. The operator therefore has to constantly monitor the carriage. When the operator detects a misalignment between an RSU and a rail, the operator is forced to stop the testing, exit the hi-rail vehicle, and recenter the carriage on the rails prior to resumption of the testing. Such repeated stopping and starting of the ultrasonic testing is both laborious and inefficient. RSU testing systems that can guide the RSUs along the rails autonomously or generally autonomously would be a significant advance over the prior art.

Various solutions have been proposed for vehicles or systems to assist railway personnel in operating rail testing systems. US Patent Publication No. 2020/0034637 of Olson et al. discloses a system for real-time asset recognition and location and includes an image capture and recognition system having a plurality of image capturing devices for capturing image data in an area surrounding a railroad track and a position determination system for determining a position of assets in the area surrounding the track. U.S. Pat. No. 9,950,716 of English et al. discloses a vehicle with a track loading and inspection device mounted on a chassis. U.S. Pat. No. 7,107,669 of Tanaka et al. discloses a system for mounting underfloor electronic equipment under the floor of a rolling stock body or railcar having an underfloor storage portion. U.S. Pat. No. 5,756,903 of Norby et al. discloses a high rail vehicle adapted with a loaded gage axle assembly located between the vehicle's sets of road wheels for applying loads to the track and measuring track strength. U.S. Pat. No. 2,978,904 of Oszkar discloses a track inspection and recording vehicle that measures and records the physical state of the track and includes a measuring carriage under the vehicle and recording equipment inside the vehicle. U.S. Pat. No. 2,388,683 of Frickey et al. discloses a method and apparatus for detecting flaws in rails and includes an electromagnet for generating electric currents to magnetize the rail and induce electrical potentials in a pick up means.

An equipment housing assembly is needed that can be secured to a hi-rail vehicle and is configurable to house and operate the testing units described herein.

SUMMARY OF THE INVENTION

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

An embodiment of an equipment housing assembly is removably securable to a frame of a hi-rail vehicle operable to advance along first and second rails of a railroad track. The equipment housing assembly includes an equipment housing that houses and/or supports railroad track testing and imaging equipment. At least one rail sensor is mounted on a sensor support and is operable to sense at least one property of at least one of the first and second rails as the hi-rail vehicle advances along the first and second rails. At least one sensor deployment motor operably engages the sensor support and is operable to advance the sensor support between a retracted configuration relative to the equipment housing and a deployed configuration relative to the equipment housing. A power distribution system housed within the equipment housing is operable to supply electrical power to the at least one sensor deployment motor. At least one first power supply cord is electrically connected at a first end to the power distribution system and removably and electrically connectable to a power source in the hi-rail vehicle. At least one computer is housed within the equipment housing and communicatively coupled to the at least one sensor deployment motor and the at least one rail sensor. A conduit extending from the equipment housing and removably securable to a cab of the hi-rail vehicle includes at least one communications cable extending through the conduit and connected at a first end to the computer. A second end of the at least one communications cable is removably couplable to a display or a computer input device or both located within the cab of the hi-rail vehicle.

When the sensor support is advanced to the deployed configuration, the at least one sensor is positioned to sense the at least one property of at least one of the first and second rails as the hi-rail vehicle advances along the first and second rails. In an embodiment, the at least one rail sensor is retracted into the equipment housing when the sensor support is advanced to the retracted configuration. In an embodiment, when the sensor support is advanced to the deployed configuration, the at least one rail sensor is positioned below the equipment housing. In an embodiment, the at least one rail sensor includes at least one roller search unit, and when the sensor support is advanced to the deployed configuration, the at least one roller search unit is positioned to engage the first or second rail extending therebelow.

The at least one computer is operable to control operation of the at least one sensor deployment motor and the at least one rail sensor and to receive sensor data from the at least one rail sensor indicative of the at least one property of at least one of the first and second rails. In an embodiment, the at least one computer includes at least one controller operable to control operation of the at least one sensor deployment motor and the at least one rail sensor, and at least one processor is operable to receive and process the sensor data received from the at least one sensor.

In an embodiment, the power distribution system includes an inverter electrically connected to the at least one first power supply cord for converting direct current from the power source in the hi-rail vehicle to alternating current to be supplied to the at least one sensor deployment motor. The power distribution system further includes a return power supply cord extending through the conduit and electrically connected at a first end to the inverter and electrically connectable at a second end to the display or the computer input device or both located within the cab of the hi-rail vehicle.

In an embodiment, the equipment housing assembly further includes a fluid supply system supported at least partially within the housing assembly and configured to dispense fluid between the at least one roller search unit and the first or second rail engaged by the roller search unit.

In an embodiment, the at least one rail sensor includes at least one roller search unit and the sensor support on which the at least one roller search unit is mounted includes a roller search unit support. The at least one rail sensor further includes at least one camera mounted on a camera support. The at least one sensor deployment motor includes a roller search unit deployment motor operably engaging the roller search unit support, and the at least one sensor deployment motor further includes a camera deployment motor operably engaging the camera support to advance the camera support between a retracted configuration relative to the equipment housing and a deployed configuration relative to the equipment housing. When the camera support is advanced to the deployed configuration, the at least one camera is positioned to capture images of at least one of the first and second rails as the hi-rail vehicle advances along the first and second rails.

In an embodiment, the equipment housing includes a platform having a plurality of brackets configured for removably connecting the equipment housing to the frame of the hi-rail vehicle.

Another embodiment of an equipment housing assembly is removably securable to a frame of a hi-rail vehicle operable to advance along first and second rails of a railroad track. The equipment housing assembly includes an equipment housing that houses and/or supports railroad track testing and imaging equipment. A roller search unit mounted on a carriage is operable to detect defects in one of the first and second rails as the hi-rail vehicle advances along the first and second rails. The carriage is operably engaged by a carriage motor operable to advance the carriage between a carriage retracted position in which the roller search unit is not in contact with either of the first and second rails and a carriage deployed position in which the roller search unit is in contact with one of the first and second rails. The carriage and the roller search unit mounted thereon are retracted into the equipment housing when the carriage is advanced to the carriage retracted position. A camera is mounted on a camera mount, and the camera mount is operably engaged by a camera mount motor operable to advance the camera mount between a camera mount retracted position in which the camera is at least partially retracted into a camera compartment in the equipment housing and a camera mount deployed position in which the camera is advanced out of the equipment housing and is positioned to capture images of at least portions of at least one of the first and second rails as the hi-rail vehicle advances along the first and second rails. At least one computer is housed within the equipment housing and communicatively coupled to the carriage motor and the camera mount motor. The at least one computer is operable to control operation of the carriage motor, the camera mount motor, the roller search unit, and the camera, and to receive data from the roller search unit and the camera. The at least one computer is communicatively couplable to a display or a computer input device or both located within a cab of the hi-rail vehicle.

Yet another embodiment of an equipment housing assembly is removably securable to a frame of a hi-rail vehicle operable to advance along first and second rails of a railroad track. The equipment housing assembly includes an equipment housing that houses and/or supports railroad track testing and imaging equipment therein. At least one rail sensor mounted on a sensor support is operable to sense at least one property of at least one of the first and second rails as the hi-rail vehicle advances along the first and second rails. At least one sensor deployment motor operably engages the sensor support and is operable to advance the sensor support between a retracted configuration relative to the equipment housing and a deployed configuration relative to the equipment housing. When the sensor support is advanced to the deployed configuration, the at least one sensor is positioned to sense the at least one property of at least one of the first and second rails as the hi-rail vehicle advances along the first and second rails. A power distribution system housed within the equipment housing is operable to supply electrical power to the at least one sensor deployment motor. At least one first power supply cord is electrically connected at a first end to the power distribution system and removably and electrically connectable to a power source in the hi-rail vehicle. At least one computer is housed within the equipment housing. The at least one computer is electrically connected to the power distribution system and communicatively coupled to the at least one sensor deployment motor and the at least one rail sensor. The at least one computer is operable to control operation of the at least one sensor deployment motor and the at least one rail sensor and to receive sensor data from the at least one rail sensor indicative of the at least one property of at least one of the first and second rails. A plurality of communications cables is connected at a first end to the at least one computer. The plurality of communications cables extends through the equipment housing and is sized to extend into the cab of the hi-rail vehicle to which the equipment housing assembly is removably secured. A second end of the plurality of communications cables is removably couplable to a display and a computer input device located within the cab of the hi-rail vehicle.

BRIEF DESCRIPTION OF THE DRAWINGS

Illustrative embodiments of the present disclosure are described in detail below with reference to the attached drawing figures.

FIG. 20 is a perspective view of the equipment housing assembly shown in FIG. 1 and coupled to a hi-rail vehicle, showing RSUs of the first RSU pod loaded onto the rail in a testing configuration for ultrasonic testing of the rail.

FIG. 21 is a plan view of the equipment housing assembly shown in FIG. 1 and coupled to the hi-rail vehicle, showing the RSUs of the first RSU pod loaded onto the rail for ultrasonic testing of the rail, as shown in FIG. 20.

Figure 1:
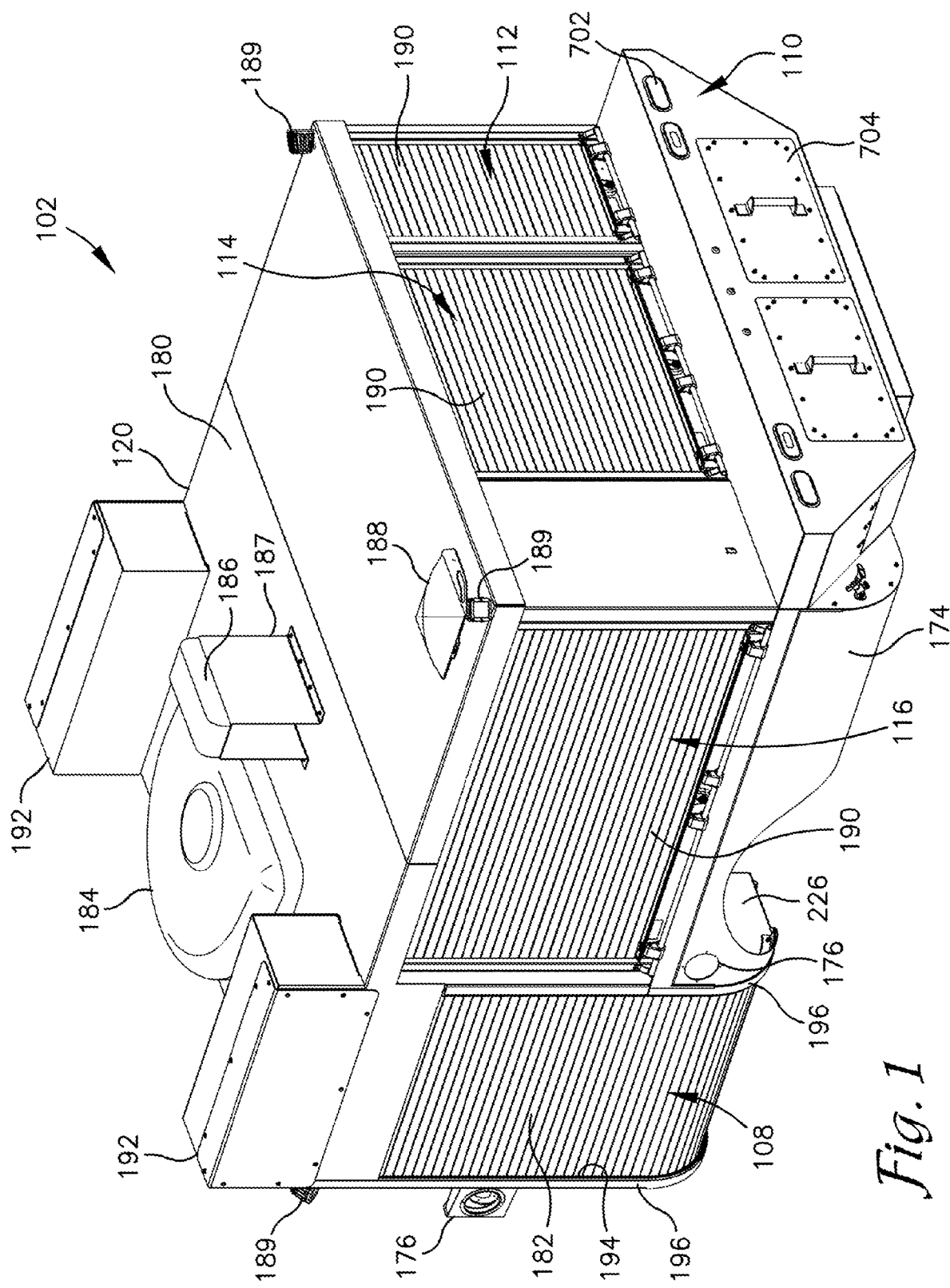
FIG. 1 is a perspective view of an embodiment of an equipment housing assembly for testing railroad rails. The equipment housing assembly includes a utility body having a plurality of compartments that are each enclosed with a door such that each compartment is accessible from an exterior of the equipment housing assembly. The equipment housing assembly is configured to be coupled to a hi-rail vehicle to form a track testing system.

The drawing figures do not limit the invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

FIGS. 1-27 show one embodiment of a track sensing or testing system 100 for imaging or testing one or more components of a railroad track. The track testing system 100 includes an equipment housing assembly 102 as shown in FIG. 1, mounted on a frame 103 of a hi-rail vehicle, such as hi-rail vehicle 104, shown in FIG. 2, for traversing a section of the railroad track to be tested. The hi-rail vehicle 104 is a conventional highway vehicle having extendable and retractable flanged wheels (not shown) configured to travel over railroad rails 106A and 106B.

In an embodiment shown in FIG. 1, the equipment housing assembly 102 is provided to house and support railroad track testing and imaging equipment (e.g., imagers and other testing devices or components of the equipment housing assembly 102, computing devices for controlling the testing devices, and material usable for testing the railroad systems), including one or more rail sensing systems deployable therefrom (e.g., imaging and rail testing devices) that are configured to sense at least one property of or to detect defects in at least one of the rails 106A and 106B as the hi-rail vehicle advances therealong.

Figure 2:
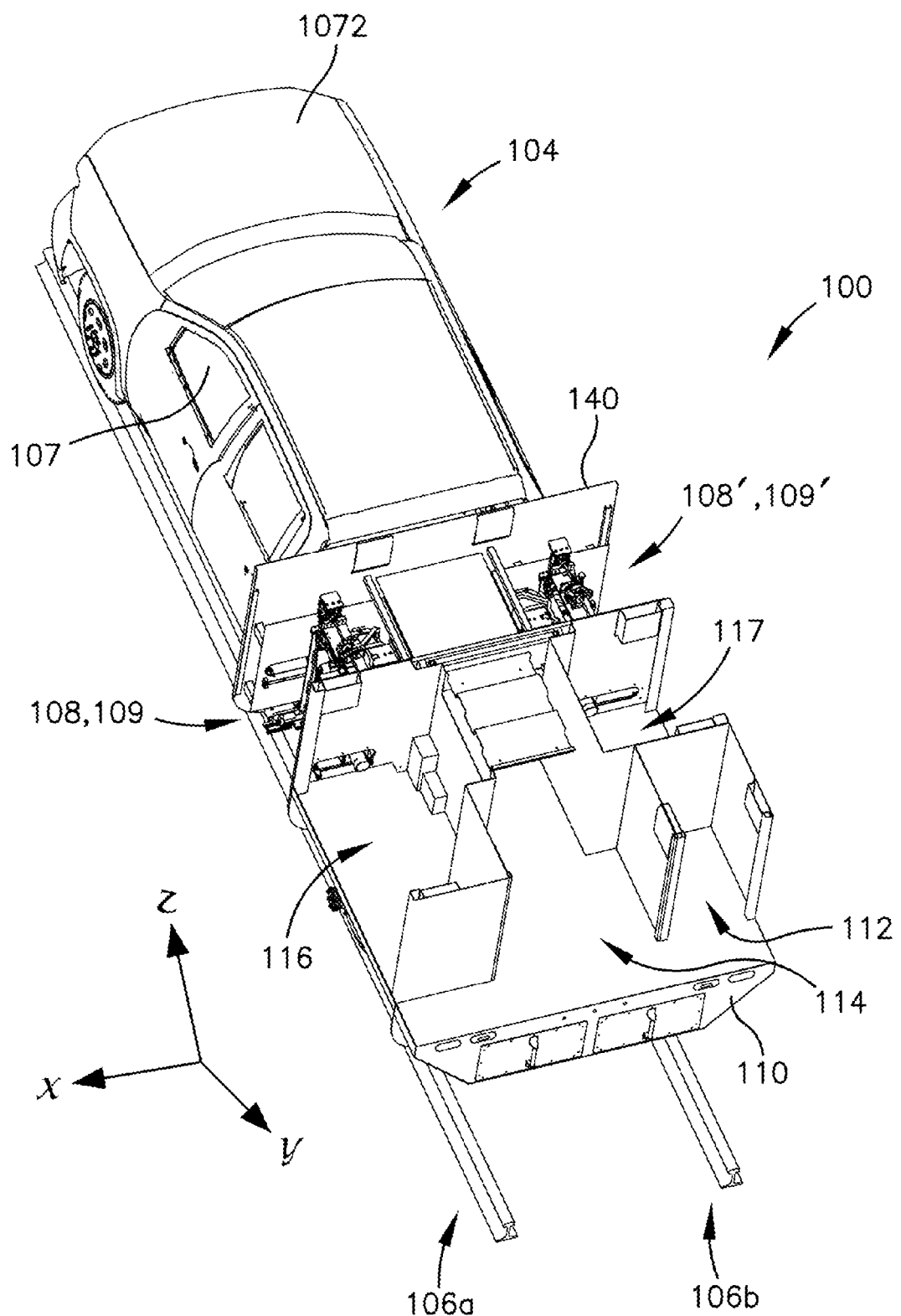
FIG. 2 is a perspective view, from above, of an embodiment of a track testing system that includes the equipment housing assembly of FIG. 1 coupled to a hi-rail vehicle. The doors of the compartments and overhead covering of the equipment housing assembly are removed to show an arrangement of the plurality of compartments.

As used herein, directional references may be made with respect to an operator or driver sitting in a cab 107 of the hi-rail vehicle 104 as shown in FIG. 2 and facing in a forward direction of travel of the hi-rail vehicle 104 with a left side of the track testing system 100, including compartment 108 housing ultrasonic rail testing apparatus 109, located on a driver side of the hi-rail vehicle 104, and a right side of the track testing system 100, including compartment 108' housing ultrasonic rail testing apparatus 109', located to the driver's right side or on a passenger side of the hi-rail vehicle. With reference to FIG. 1, a front or forward end of the equipment housing assembly 102 is to a left of the page and a rearward end is to a right of the page. Similarly, a top or upper portion of the equipment housing assembly 102 extends toward a top of the page and a bottom or lower portion extends toward a bottom of the page.

The words "inwardly" and "outwardly" will refer to directions toward and away from, respectively, a geometric center of the equipment housing assembly 102 or a component being described and designated parts thereof. Said terminology will include the words specifically mentioned, derivatives thereof and words of a similar import. As used herein the words secure or secured or connect or connected or variations thereof include parts or components that are both formed separately and joined together, as by welding or through a mechanical coupling, or parts or components that are integrally formed together.

Figure 3:
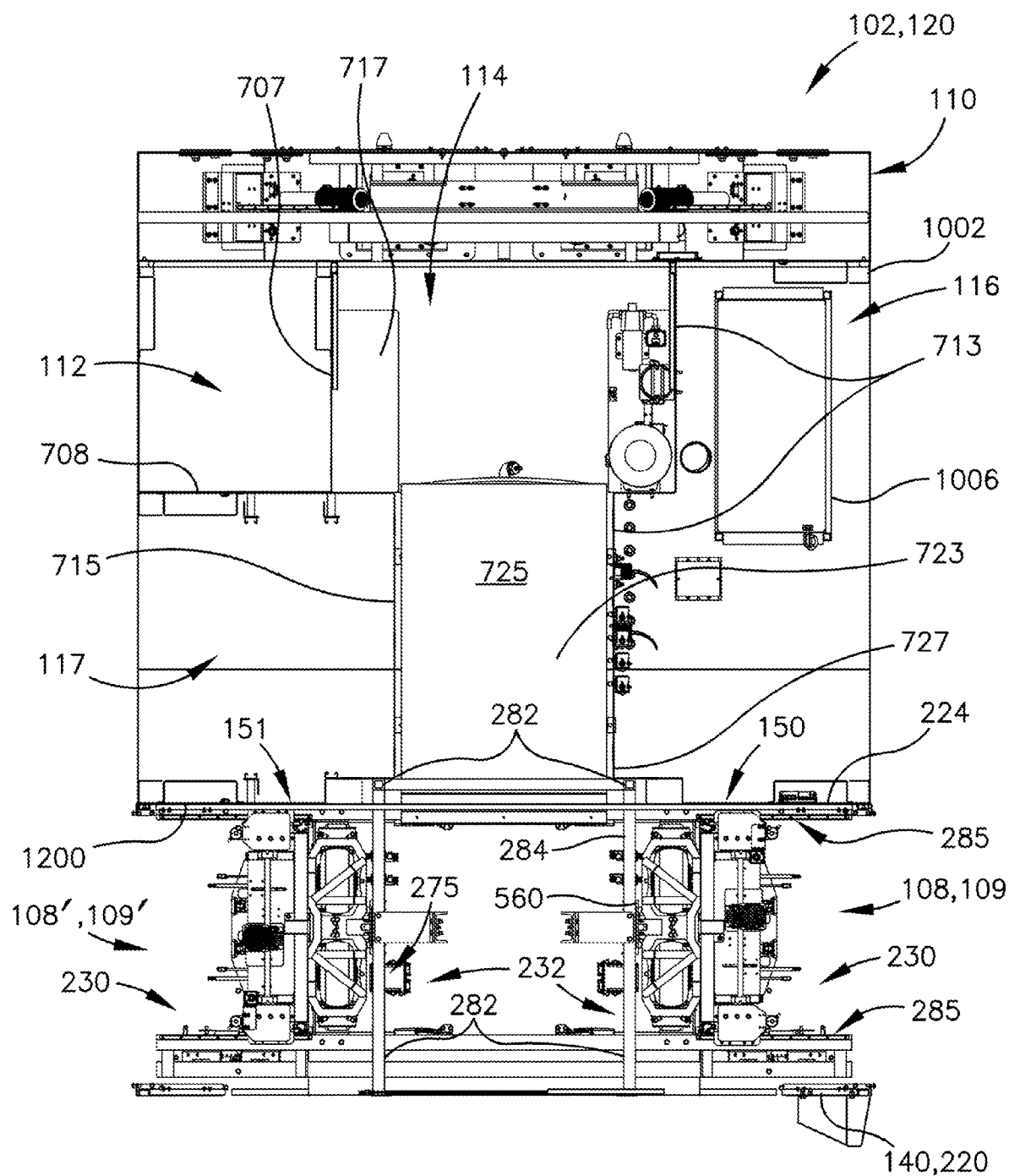
FIG. 3 is a plan view of the equipment housing assembly as shown in FIG. 1, with the covering of the equipment housing assembly and doors to a forward driver side compartment and a forward passenger side compartment removed. The forward compartments each include an embodiment of a rail testing apparatus in a storage configuration therein, and a control system compartment includes a shelf unit configured to secure a power distribution and control system therein. A top covering or flooring of the equipment housing assembly is removed from an imaging system compartment on a rear of the equipment housing assembly.

FIG. 3 shows a plan view of the equipment housing assembly or modular housing system or bay 102, including a plurality of compartments or modules 108 and 108', 110, 112, 114, 116, and 117 formed in a utility body 120. The plurality of compartments 108 and 108', 110, 112, 114, 116, and 117 house the railroad track testing and imaging equipment, including one or more rail sensing systems that may be deployable therefrom for testing or imaging the rails 106A and 106B of the railroad track or the track right of way. The one or more rail sensing systems are described herein and in U.S. Patent Application Publication No. 2024/0025461 to Roe et al., the disclosure of which is incorporated by reference herein in its entirety. The utility body 120 of the equipment housing assembly 102 is generally symmetrical along a longitudinal axis from the front to the rear thereof, including a general layout of the compartments 108 and 108', 110, 112, 114, 116, and 117, although internal walls and/or dividers may not be symmetrical and may be configured for a specified use. In an embodiment, a distribution of a weight of the equipment housing assembly 102, including the weight of the components therein, is generally symmetrical across the longitudinal axis.

The equipment housing assembly 102 is configured to be removably secured or mounted to the frame 103 of the hi-rail vehicle 104. It is foreseeable that the equipment housing assembly 102 may be removably coupled to another type of vehicle that includes extendable and retractable flanged wheels able to travel over the rails 106A and/or 106B of the railroad track to be tested, such as, for example, a trailer or a train car. In an embodiment, the equipment housing assembly 102 is removably secured to a first hi-rail vehicle 104 and may be removed therefrom to allow separate servicing of the equipment housing assembly 102 and/or the first hi-rail vehicle 104, and the equipment housing assembly 102 may be removably secured to an alternate or second hi-rail vehicle 104 for continued operation. In an embodiment, the equipment housing assembly 102, including the utility body 120 with the railroad track testing and imaging equipment, is transferable from the first hi-rail vehicle 104 by uncoupling the equipment housing assembly 102 therefrom and transferring and coupling the equipment housing assembly 102 to a second hi-rail vehicle 104.

Figure 4:
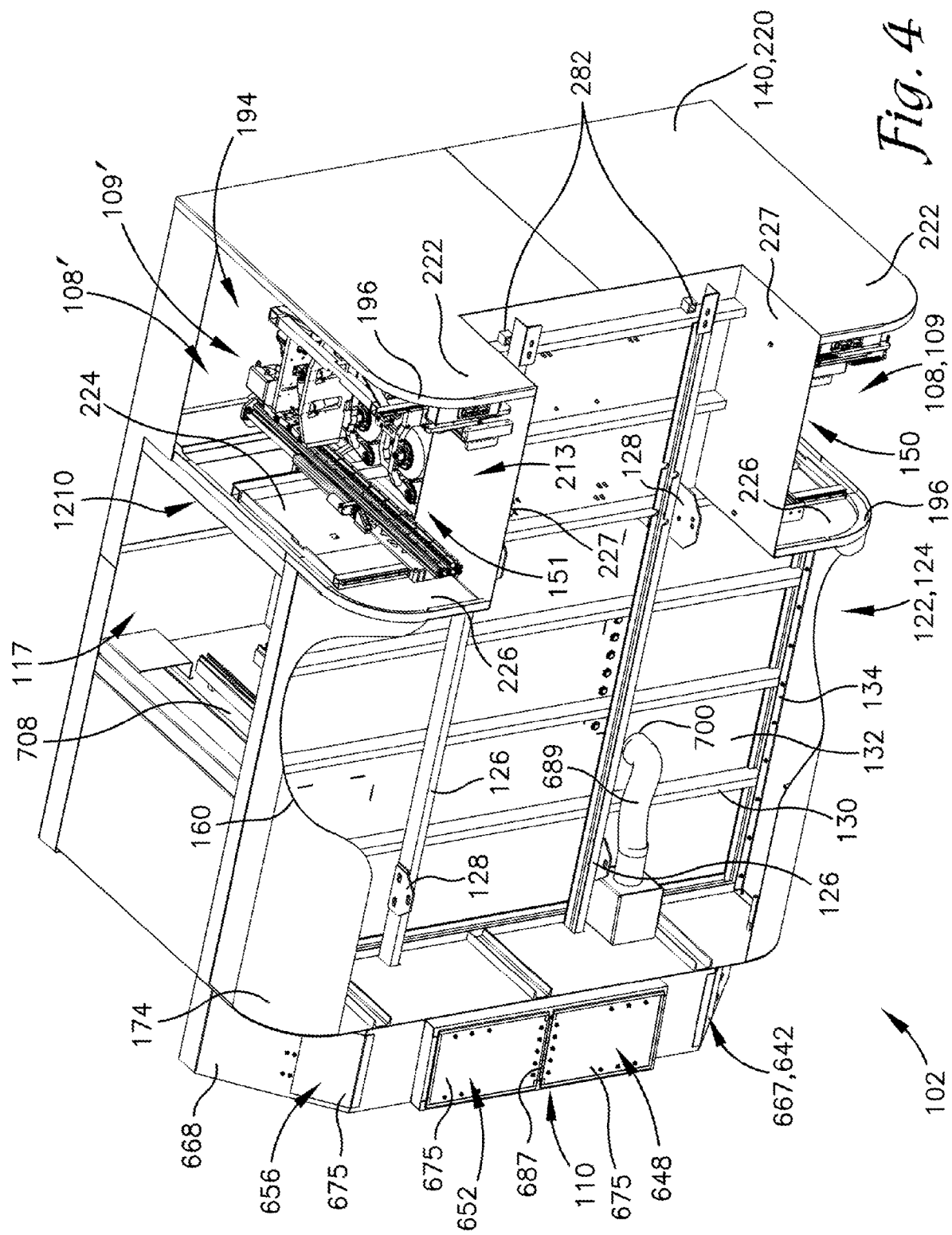
FIG. 4 is a perspective view of a bottom and passenger side of the equipment housing assembly shown in FIG. 1, showing a support structure of a deck and including the rail testing apparatus in a forward passenger side compartment with the door removed.
Figure 5:
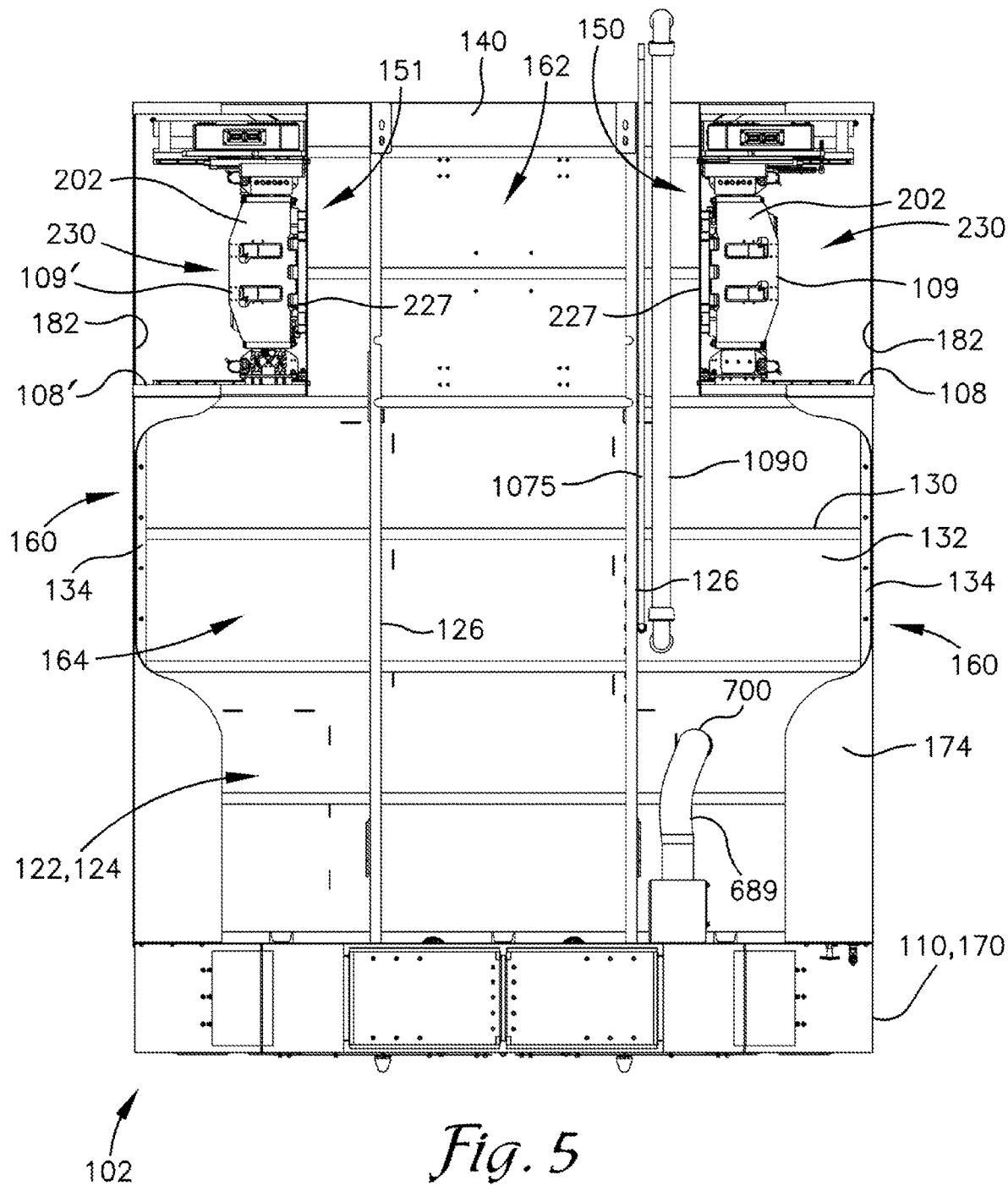
FIG. 5 is a bottom view of the equipment housing assembly shown in FIG. 1 and includes an imaging system conduit extending between the imaging system compartment and the control system compartment and a main conduit and a power supply conduit extending from the control system compartment, both configured to be coupled to the hi-rail vehicle.

FIGS. 4 and 5 show a bottom view of a deck 122 of the equipment housing assembly 102. The platform or deck 122 includes structure for securing the equipment housing assembly 102 to the hi-rail vehicle 104. A support structure or under frame 124 of the deck 122 includes two longitudinal support members or beams 126 that extend lengthwise from a front (adjacent to the cab 107 of the hi-rail vehicle 104) to a rear of the equipment housing assembly 102. Brackets 128, mounting flanges or other mounting means are connected to the support structure 124 and configured to releasably secure the equipment housing assembly 102 to frame rails 103 of the hi-rail vehicle 104 with one or more bolts, fasteners or other securement means. The brackets 128 may be secured, for example, to the longitudinal members 126, cross members 130, or side rails 134. The mounting brackets 128 are positioned to align or mate with a mounting structure or feature on the frame 103 of the hi-rail vehicle 104 that facilitates bolting or otherwise securing the mounting brackets 128 thereto, including, for example, slots or apertures formed in the frame rails 103. The cross members 130 extend transverse to the longitudinal members 126, or at right angles to the long axis, and support a flooring 132 thereon. The deck 122 may include the side frame members or side rails 134 on each side thereof to further secure the cross members 130 of the deck 122.

The deck 122 extends rearward from a headboard 140, positioned proximate and spaced from the cab 107, to adjacent to or over compartment 110 which may be referred to as the lower rear compartment 110. In an embodiment, left and right deployment openings 150 and 151, respectively, are formed in the flooring 132 on lateral sides of the deck 122 rearward of the headboard 140 and forward of rear tire openings 160. The deployment openings 150 and 151 may form a narrow portion 162 of the deck 122 therebetween. The openings 150 and 151 extend below or open into at least a portion of the compartments 108 and 108' that support the ultrasonic rail testing apparatuses 109 and 109' therein, as described herein. The openings 150 and 151 of the deck 122 are located such that at least a portion of each respective compartment 108 and 108' extends over the rails 106A and 106B, respectively, and the rails 106A and 106B extend in vertically spaced alignment below the respective compartments 108 and 108'. The narrow portion 162 is wider than the distance between the longitudinal members 126 and is narrower than a width or distance between the rails 106A and 106B of the railroad track.

In one embodiment, the deck 122 rearward of the narrow portion 162 extends adjacent to or over the lower rear compartment 110 and forms a second or wide portion 164 of the deck 122 that may have a width at least as wide as a width or distance extending between the field sides of the rails 106A and 106B. The second portion 164 of the deck may have a width that is wider than, the same, or narrower than that of the narrow portion 162 of the deck 122. The second portion 164 of the deck 122 is configured to support the lower rear compartment 110 such that an imaging system 170 deployed therefrom is able to capture images of the field sides and the gauge sides of the rails 106A and 106B.

In an embodiment, fenders 174 extend downward from the deck 122 and have the tire openings 160 formed therein configured to provide access to rear road tires 175 of the hi-rail vehicle 104. A fuel fill inlet 176 may be formed in the fender 174 and/or coupled to the utility body 120 and flow connected to a fuel tank of the hi-rail vehicle 104.

The equipment housing assembly 102 includes a roof or covering 180 as shown in FIG. 1 extending across a top of the equipment housing assembly 102 to protect an interior thereof and components positioned within the equipment housing assembly 102. In an embodiment, the covering 180 includes one or more covering members that are in covering relationship with one or more of the compartments 108 and 108', 112, 114, 116, and 117. In an embodiment, portions of the covering 180 may extend above compartments 108 and 108' to accommodate the rolling doors 182 when stored or coiled thereabove. In an embodiment, one or more of the compartments 108 and 108', 112, 114, 116, and 117 includes a roof, cover or covering 180 that is integrated therewith.

Various components to support operation of the equipment housing assembly 102 may be secured to the roof 180 of the equipment housing assembly 102 as shown in FIG. 1. In an embodiment, a cooling unit 184 is secured to and positioned on top of the roof 180 and communicates with, one or more of the compartments 108 and 108', 112, 114, 116, and 117 or the interior of the equipment housing assembly 102 to control a temperature therein. In an embodiment, a strobe light 186 is supported on a mount 187 secured to and extending above the roof 180 to maximize visibility of the hi-rail vehicle 104, especially when the hi-rail vehicle 104 is on the railroad tracks and in a testing mode. In an embodiment, a positioning or navigation system 188, such as a Global Positioning System (GPS), is mounted on the roof 180 of the equipment housing assembly 102. One or more lights 189 may also be secured to the utility body 120 and/or the roof 180 of the equipment housing assembly 102 to illuminate a surrounding area thereof during non-daylight work that may occur on or off of the railroad tracks.

The plan view in FIG. 3 shows the compartments 108 and 108', 110, 112, 114, 116, and 117 of the equipment housing assembly 102 that are configured to house and/or support operations of deployable and non-deployable railroad track testing and imaging equipment for testing and imaging of the rails 106A and 106B and the track right of way. Various components support operation of the railroad track testing and imaging equipment, including, for example, a rail spraying or fluid supply system, a power distribution system, and one or more computer systems that includes one or more computers, controllers, processors or data acquisition systems configured for disposition and operation the rail testing and imaging equipment. The compartments 108 and 108', 110, 112, 114, 116, and 117 may also be used for storage of maintenance-of-way equipment and/or storage of employee belongings. Each of the compartments is configured to accommodate the respective system housed and secured therein and includes walls or partitions secured to the deck 122 to form the compartments. In an embodiment, each compartment is formed as an independent module with one or more walls and the compartments are secured to the deck 122 and to neighboring compartments to form the equipment housing assembly 102.

Each compartment 108 and 108', 112, 114, 116, and 117 is formed with at least one opening for access thereto from an exterior of the equipment housing assembly 102. It is foreseen that access to each compartment may be provided through an access opening formed in the deck 122, in the covering 180, and/or through another compartment adjacent thereto. In an embodiment, the opening formed in each of the compartments 108 and 108' is configured to receive the door 182 that may be opened to provide access thereto. In an embodiment, a portion of each door 182 extends across the respective access opening formed in the deck 122 and under the ultrasonic rail testing apparatuses 109 and 109' when positioned in a retracted or storage position. One or more of the compartments 112, 114, 116, and 117 may likewise include openings formed therein configured to receive doors 190 that allow for the respective compartment to be accessed from an exterior of the equipment housing assembly 102. One or more of the doors 182 and 190 may be a rolling door that rolls up to store in a coil above the respective opening. It is foreseeable that one or more of the compartments 108 and 108', 112, 114, 116, and 117 may not have a door and/or that another type of door could be used for accessing one or more of the compartments 108 and 108', 112, 114, 116, and 117.

The compartments 108 and 108' are generally identical and house the ultrasonic rail testing apparatuses 109 and 109' that are generally identical, at least relative to the respective rail 106A and 106B, and descriptions herein with reference to the forward driver side compartment 108 and the ultrasonic rail testing apparatus 109 are generally applicable to the forward passenger side compartment 108' and the ultrasonic rail testing apparatus 109'. As shown in FIG. 1, the compartments 108 and 108' each include a door compartment 192 positioned above the compartments 108 and 108' and above an opening 194 formed therein and configured to support the door 182. The door 182 may be a curtain- or slat-type door that retracts or coils into the door compartment 192, at least when the ultrasonic rail testing apparatuses 109 or 109' are in a deployed position. The door opening 194 formed in each compartment 108 and 108' is positioned to face the field side of the rails 106A and 106B with the respective compartment 108 and 108' accessible therefrom. At least one door guide or track 196 that guides and supports each door 182 into and out of covering relationship with the opening 194 is secured to each compartment 108 and 108'. In the compartments 108 and 108', the at least one door guide 196 extends from proximate the door compartment 192 and guides the door 182 from a retracted or open position to under the associated compartment 108 and 108' as the door is extended into a closed position that may fully enclose the compartment 108 or 108', such as when the ultrasonic rail testing apparatus 109 or 109' is in an initial or stowed configuration 201I for storage, as described herein. Similarly, the at least one door guide 196 guides the door 182 from the closed position to the retracted or open position with the door 182 coiled in the door compartment 192 when the ultrasonic rail testing apparatus 109 or 109' is in a testing configuration 201F for testing, as described herein. As shown in FIG. 4, in an embodiment, the at least one door guide 196 curves below the ultrasonic rail testing apparatuses 109 and 109', such that the door 182 is closeable or extendable under the ultrasonic rail testing apparatuses 109 and 109' when components thereof are in a stored position 201I to protect the ultrasonic rail testing apparatuses 109 and 109' when not in use (e.g., while the apparatus 109 is being stored overnight, stored between jobs, or transported to a section of track to be inspected).

Figure 6:
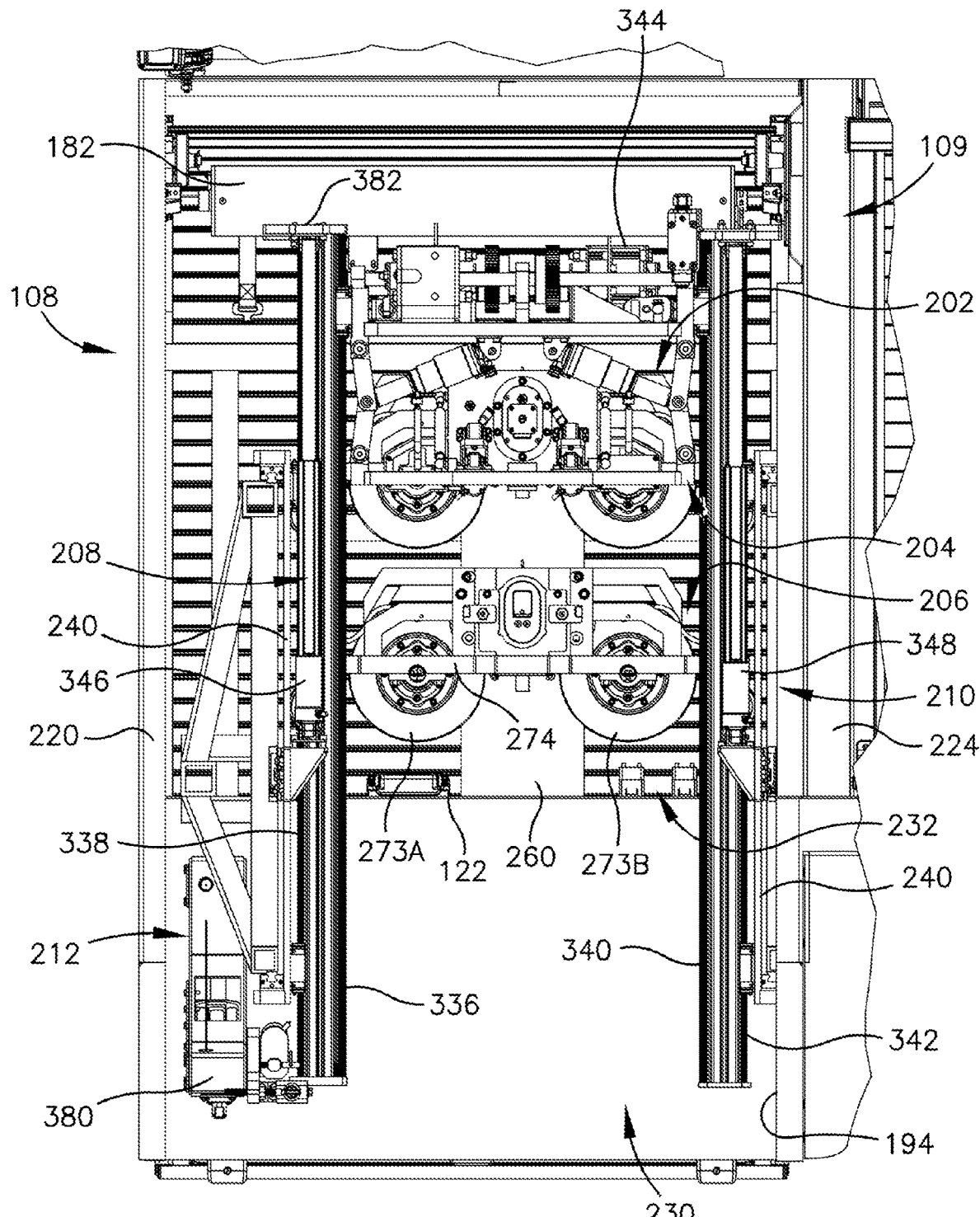
FIG. 6 is a perspective view of an embodiment of the rail testing apparatus housed in the forward driver side compartment in the equipment housing assembly of FIG. 1. The rail testing apparatus is positioned in the forward driver side compartment in a storage configuration.

FIG. 6 shows the driver side compartment 108 with the rolling door 182 fully retracted or opened to illustrate an embodiment of the ultrasonic rail testing apparatus 109 contained therein. The ultrasonic rail testing apparatus 109 comprises a carriage 202, a primary roller search unit (RSU) or sensor pod 204, a secondary RSU or sensor pod 206, a proximal mobile track system 208, a distal mobile track system 210, and a pivotable sensor system 212 for housing time of flight (TOF) sensors. Each of these components are described in more detail herein. The proximal mobile track system 208 is proximate the cab 107 of the hi-rail vehicle 104 relative to the distal mobile track system 210. The proximal mobile track system 208 may alternatively be referred to as the front mobile track system 208 and the distal mobile track system 210 may alternatively be referred to as the rear mobile track system 210.

The forward compartment 108, on the passenger side of the equipment housing assembly 102, and the forward compartment 108', on the driver side of the equipment housing assembly 102, are each configured to house the respective ultrasonic rail testing unit or apparatus 109 or 109'. As described herein, at least a portion of the forward compartments 108 and 108' are positioned to extend over the respective rail 106A or 106B when the hi-rail vehicle 104 to which the equipment housing assembly 102 is mounted is advanced on the rails 106A and 106B. In one embodiment, the forward compartments 108 and 108' are positioned forward of the rear road tires 175 and/or the flanged wheels. As described herein, the forward compartments 108 and 108' are configured such that the sensor pods 204 and 206 of each of the apparatuses 109 and 109' are deployable in at least a vertical direction along a Z-axis (see FIG. 2 for orientation of the X, Y and Z-axes) to be in contact with or in close proximity to the respective rail 106A and 106B on the respective driver side or passenger side of the equipment housing assembly 102. Engagement of the ultrasonic rail testing apparatuses 109 and 109' with the rails 106A and 106B is further described herein.

FIGS. 3-5 show the compartments 108 and 108' formed in the left and right deployment openings 150 and 151, respectively. The compartments 108 and 108' extend at least partially below the deck 122 and do not have a bottom enclosure. In an embodiment, the opening 194 includes an opening 213 continuous therewith that extends across a bottom thereof and is open to the rail 106A or 106B when the rolling door 182 is not covering the opening 213 such that at least the pods 204 or 206 of the ultrasonic rail testing apparatuses 109 or 109' may be deployed through the opening 213 to engage the rails 106A or 106B.

The compartments 108 and 108' are bounded on a forward end by the headboard 140 that extends across and in spaced relationship from the rear side of the cab 107 of the hi-rail vehicle 104 and is at least as wide as the width or distance extending between the rails 106A and 106B. The headboard 140 forms the forward sidewall 220 of the compartments 108 and 108' and is adjacent to the proximal mobile track systems 208 of the ultrasonic rail testing apparatuses 109 and 109'. FIG. 4 shows that at least a section of the headboard 140 extends below the level of the deck 122. The section of the headboard 140 extending below the level of the deck 122 may be referred to as a lower portion 222 of the forward sidewall 220.

The compartment 108 is bounded on a rearward end by the driver side compartment 116 and a sidewall 224 is formed therebetween that is adjacent to the distal mobile track system 210 of the ultrasonic rail testing apparatuses 109. The sidewalls 220 and 224 extend vertically and in parallel at least from the deck 122, and preferably from below the deck 122, to the covering 180. Directed toward the lower portion 222 of the forward sidewall 220 is a lower portion 226 of the rearward sidewall 224. The lower portions 222 and 226 include curved corners at an outer, bottom edge thereof that support the at least one door guide 196 that guides the door 182 into covering relationship with the opening 194 that includes the opening 213 that extends below the ultrasonic rail testing apparatus 109. The lower portions 222 and 226 extending below the level of the deck 122 are connected at inner edges to a sheet metal portion 227 extending downward from the deck 122 and along a longitudinally extending edge of the narrow portion of the deck 122.

Figure 7:
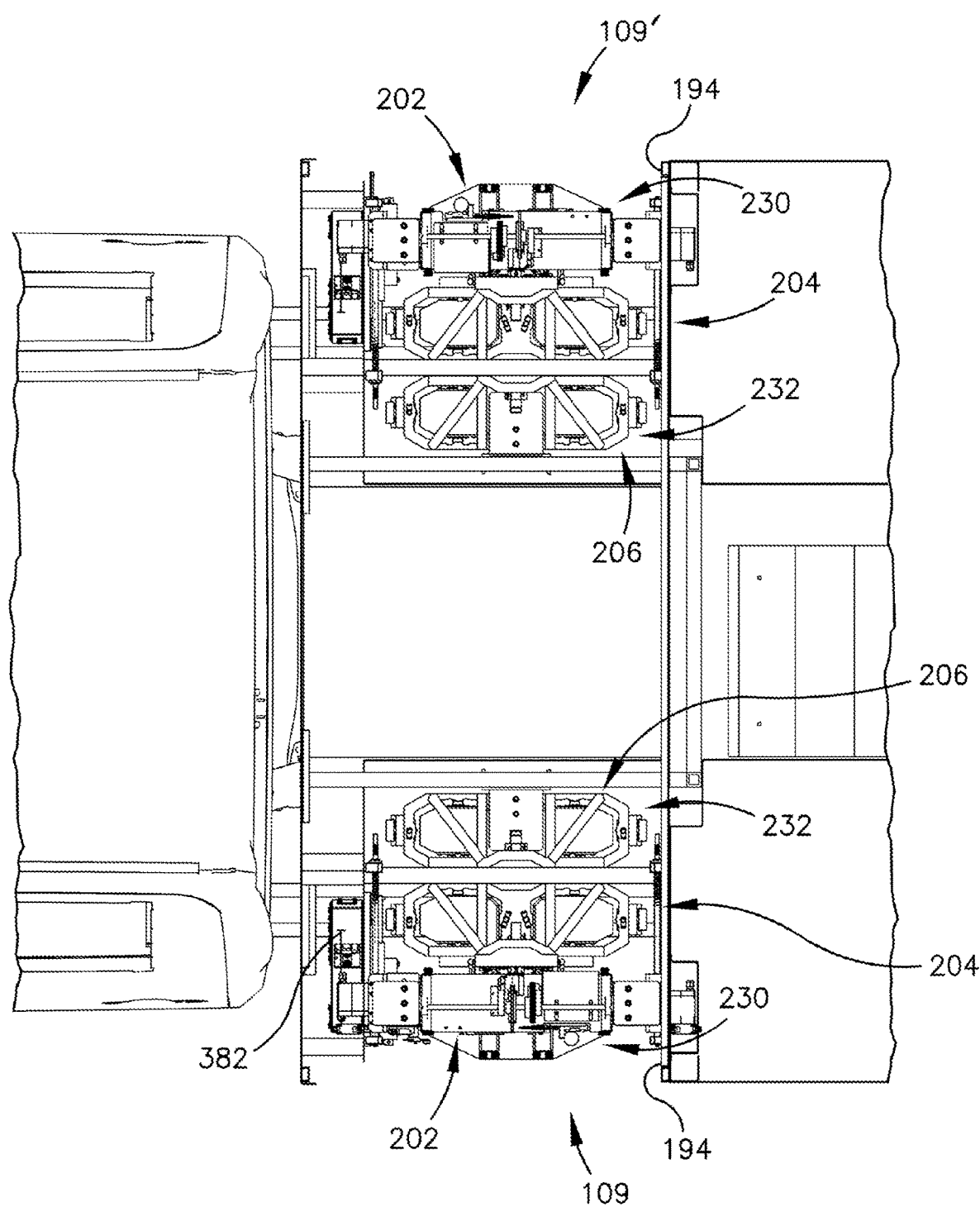
FIG. 7 is a section view of the equipment housing assembly of FIG. 1 showing the forward driver side compartment and the forward passenger side compartment. Each compartment includes a rail testing apparatus having a first roller search unit (RSU) pod coupled to a carriage positioned in an actuation section of the compartment and second RSU pod positioned in a storage section of the compartment.

FIG. 7 is an overhead view of the forward compartments 108 and 108' and shows that the compartments 108 and 108' are each divided into an outer section or a track actuation section 230 through which the ultrasonic rail testing apparatuses 109 and 109' are moveable at least vertically, or along the Z-axis, to engage the rails 106A and 106B and an inner section or storage section 232 in which the pods 204 and 206 of the ultrasonic rail testing apparatuses 109 and 109' are stored when not in use. The division between the actuation section 230 and the inner section 232 may be defined by the deck 122 that forms the floor of the inner section 232, but does not extend into the actuation section 230, such that the actuation section 230 does not have a lower surface or floor. In an embodiment, the track systems 208 and 210 move horizontally from the inner section 232 to the actuation section 230 on support frames or carriages 240, shown in FIGS. 9 and 10 adjacent to the respective forward sidewall 220 and the rearward sidewall 224 of the compartment 108. The deck 122 of the inner section 232 may be configured such that X-axis motors 250 and 252 are secured thereto and supported thereon, and move the track systems 208 and 210 laterally and horizontally from the inner section 232 to the actuation section 230.

The inner section 232 of the forward compartment 108 is positioned inward from the actuation section 230 and configured to store the pods 204 and 206. The pod 206 is generally identical to the pod 204 and may be used for rail testing in place of the pod 204, e.g., when the pod 204 is being serviced or needs servicing. In an embodiment, each pod 204 and 206 is used for testing may be periodically cycled into and out of use to ensure that the pod 204 and the pod 206 encounter comparable wear.

Figure 8:
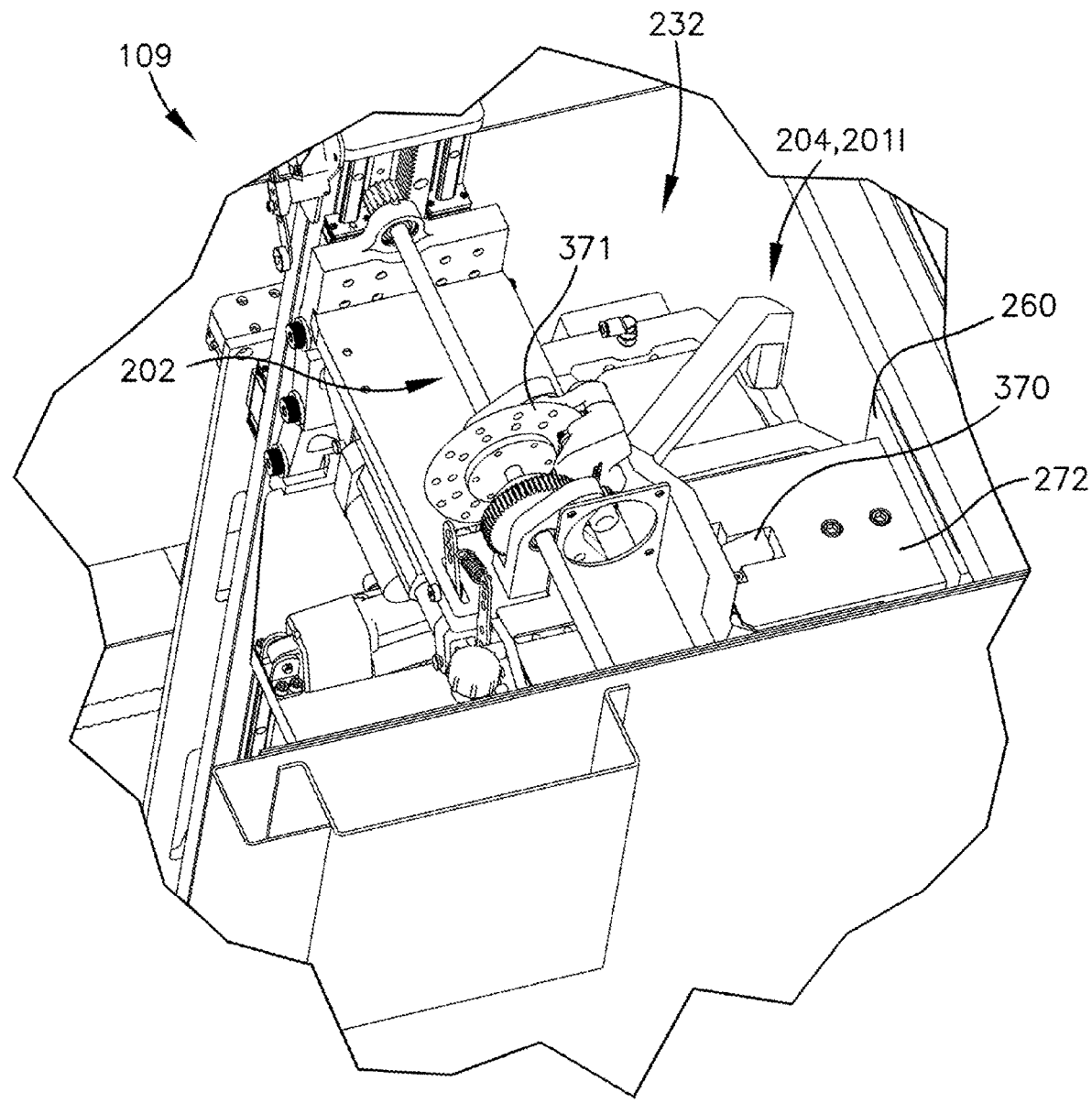
FIG. 8 is a section view of the rail testing apparatus shown in FIG. 6 with the first RSU pod secured to a first holster in a storage configuration in the forward compartment.

In FIG. 8, the pod 204 is shown in a storage position in the inner section 232. In one embodiment, the primary pod 204 is removably holstered or locked to a first holster 272 secured to a vertically extending mount 260. In an embodiment, the secondary pod 206 is removably holstered or locked to a second holster, formed similarly to the first holder 272, secured to the vertically extending mount 260 below the first holster 272.

Each pod 204 and 206 includes two RSUs 273A and 273B that are rotatably coupled to a frame 274 of the respective pod 204 or 206 and are aligned therein. The RSUs 273A and 273B, which may generally be referred to as rail sensors, are alignable with the rail 106A or 106B and configured to engage and roll over the rail 106A or 106B for ultrasonic testing. Each pod 204 and 206 is configured to include means to adjustably tilt or move, such as by, for example, actuators, hinges, shocks, springs, and other foreseeable means, to position the RSUs 273A and 273B relative to a head of the rail 106A or 106B to ensure appropriate alignment therebetween.

The inner section 232 of the forward driver side compartment 108 may be continuous and adjacent to the inner section 232 of the forward passenger side compartment 108'. In an embodiment, the forward compartments 108 and 108' are adjoined over the deck 122 and do not have a separating wall therebetween. The forward compartments 108 and 108' are configured such that a support assembly 275 extends through both compartments 108 and 108' and supports the ultrasonic rail testing apparatuses 109 and 109' therein, including at least the mobile track systems 208 and 210, the carriages 202, the pods 204 and 206, and the pivotable TOF sensor systems 212.

As shown in FIG. 3, support assembly 275 includes two vertical support posts 282 in the inner section 232 of each forward compartment 108 and 108'. The vertical support posts 282 are secured to the deck 122 and extend upward through the flooring 132. The vertical support posts 282 support one or more horizontally extending braces 284 that extend rearward from the headboard 140 in the inner section 232 of each compartment 108 and 108' and are secured to or support the vertically extending mounts 260 that support the holsters 272 in each of the compartments 108 and 108'.

Figure 9:
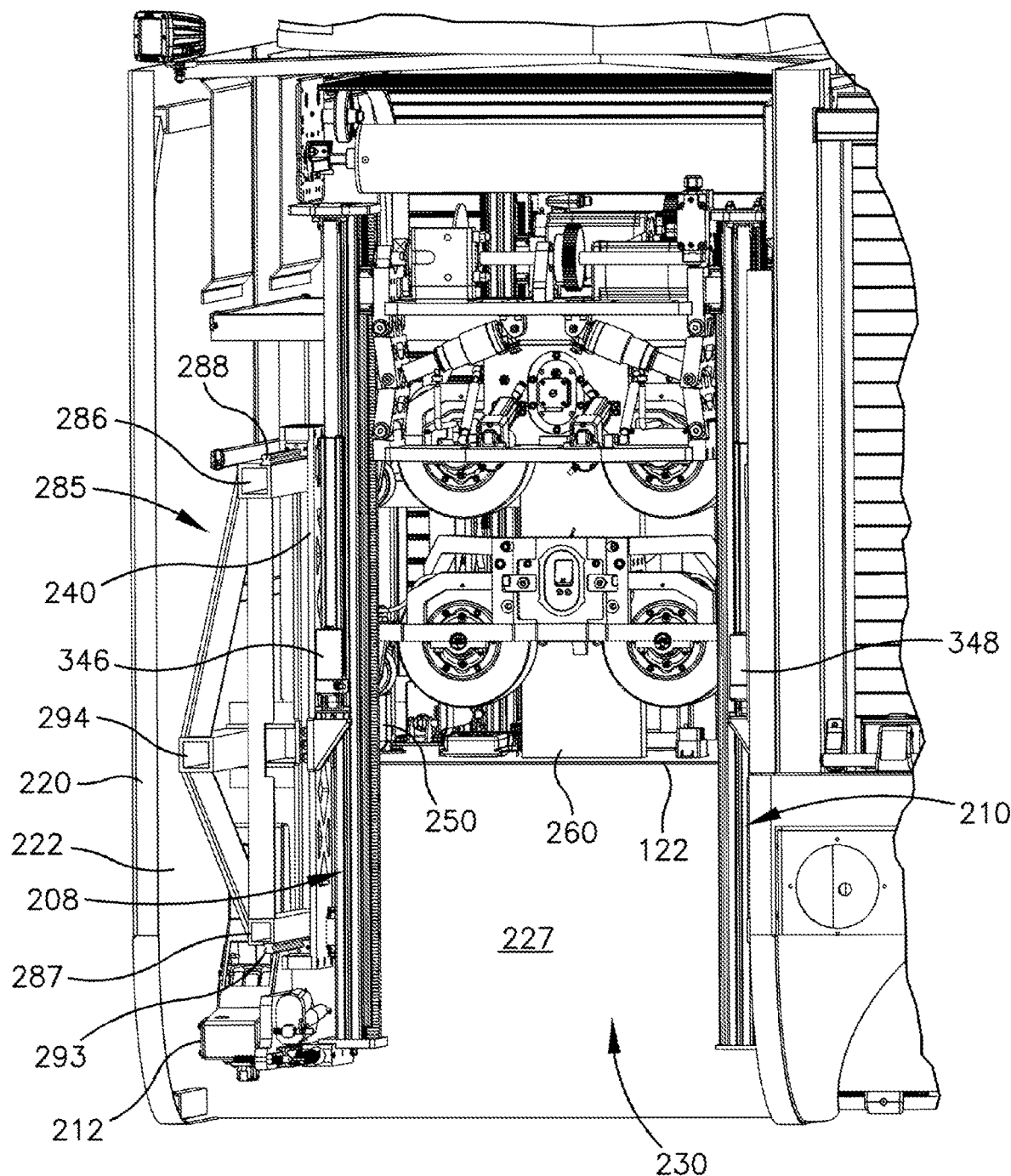
FIG. 9 is a perspective view of the rail testing apparatus of FIG. 6 showing a support frame and an x-axis motor adjacent to a forward sidewall of the forward driver side compartment.
Figure 10:
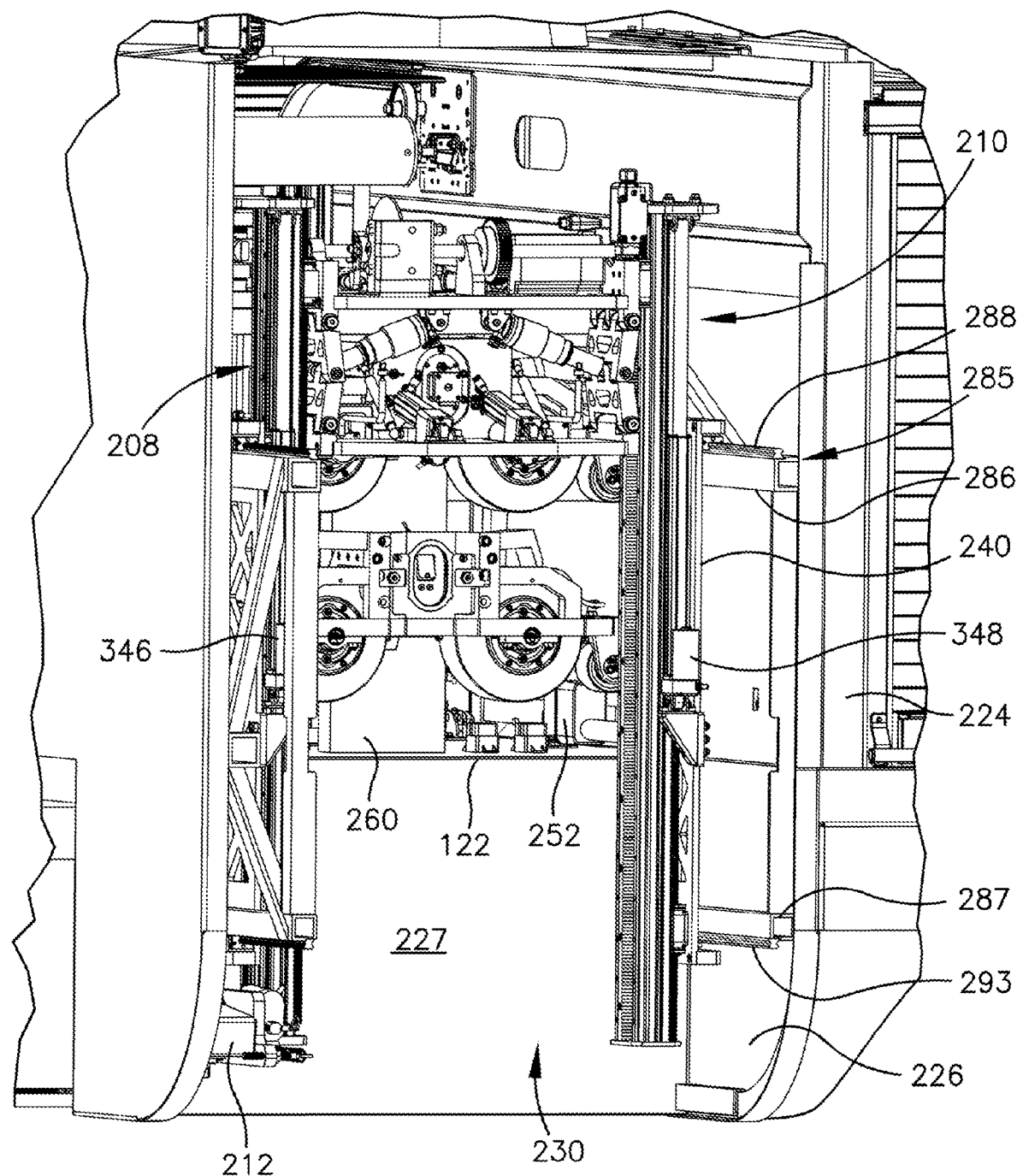
FIG. 10 is a perspective view of the rail testing apparatus of FIG. 6, showing a support frame and an x-axis motor adjacent to a rearward sidewall of the forward driver side compartment.
Figure 11:
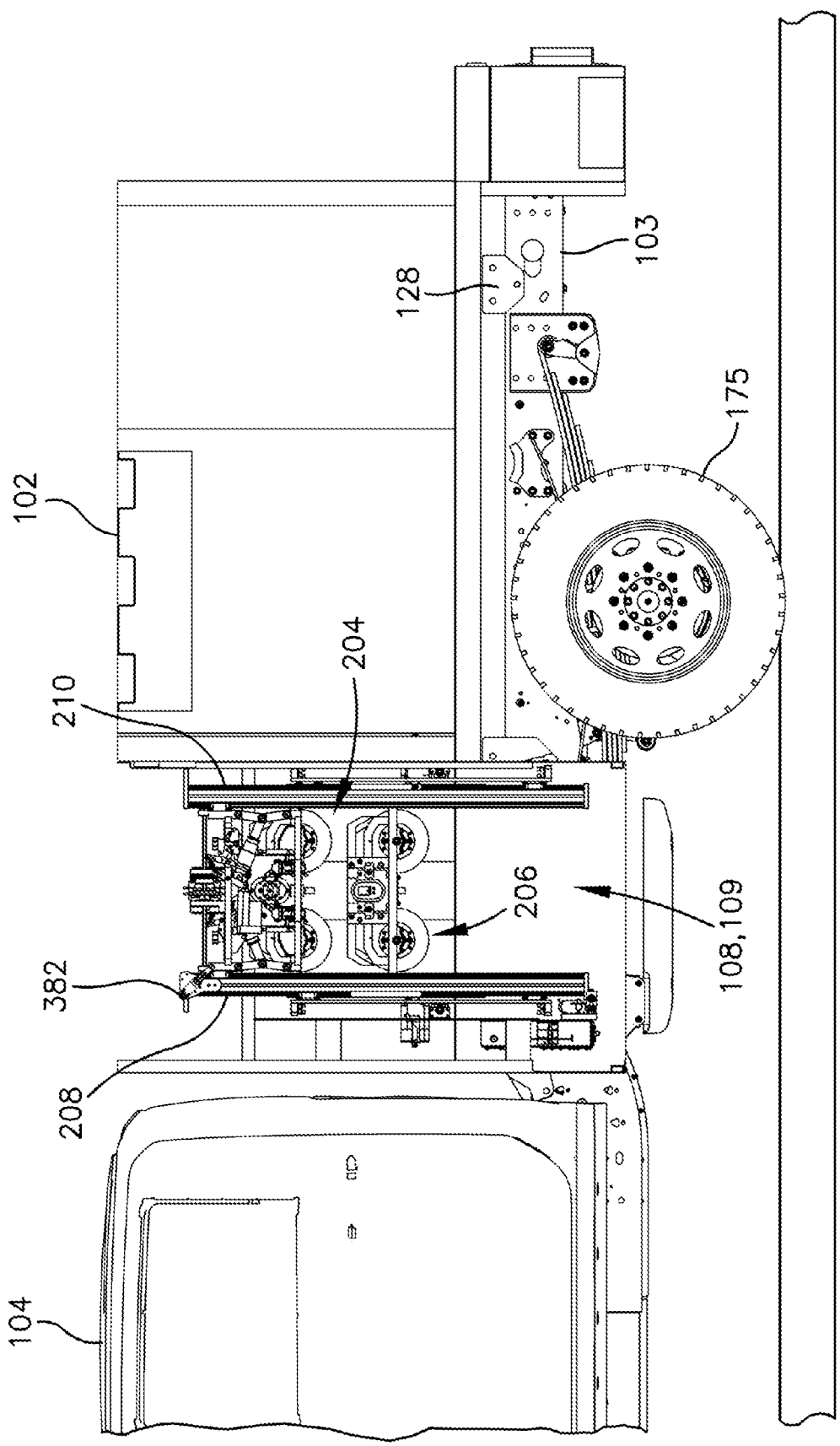
FIG. 11 is an elevation view of the rail testing apparatus shown in FIG. 6, showing a carriage coupled to a first RSU pod at an uppermost point on a mobile track system.

The support assembly 275 includes support frames 285 that extend on each side of the ultrasonic rail testing apparatuses 109 and 109' and extend transversely across the equipment housing assembly 102 from the forward driver side compartment 108 to the forward passenger side compartment 108'. As shown in FIGS. 9 and 10, each support frame 285 includes an upper guide member 286 that extends above the deck 122 and a lower horizontal support beam or lower guide member 287 that extends below the deck 122. The upper guide member 286 extends through both forward compartments 108 and 108' and may be supported on one of the horizontally extending braces 284 in each of the compartments 108 and 108'. Each upper guide member 286 includes an upper X-axis guide 288 at each end thereof that extends at least through the actuation section 230 of each of the compartments 108 and 108'. In the embodiment shown, the upper X-axis guide 288 is secured to a top of the upper guide member 286. The lower guide members 287 are spaced vertically below and parallel to the upper guide members 286 in the forward compartments 108 and 108'. Each lower guide member 287 extends adjacent to or along the lower portion 222 of the forward sidewall 220 or the lower portion 226 of the rearward sidewall 224 and may be supported from the upper guide member 286. Each lower guide member 287 includes a lower X-axis guide 293 at an end thereof that extends at least through the actuation section 230. In the embodiment shown, the lower X-axis guide 293 is secured to a bottom of the lower guide member 287. The X-axis guides 288 and 293 are configured to enable the mobile track systems 208 and 210 to move along the X-axis. The X-axis motors 250 and 252 include actuators extending therefrom that are coupled to the support frames or carriages 240 to move the mobile track systems 208 and 210 along the X-axis on the X-axis guides 288 and 293. In an embodiment, the mobile track systems 208 or 210 are secured to the support frame 240, and the upper X-axis guides 288 guide an upper end of the carriage 240 that is moveably supported thereon and the lower X-axis guides 293 guide a lower end of the carriage 240 that is moveably supported thereunder.

The support frame 285 that supports the proximal mobile track system 208 may include an intermediate horizontal support beam 294 (FIG. 9) that extends between and spaced apart from the upper guide member 286 and the lower guide member 287. The horizontal support beam 294 extends transversely across the equipment housing assembly 102, through the forward driver side compartment 108 and through the forward passenger side compartment 108', and may be supported on the flooring 132 slightly forward (or toward the cab 107) in relation to the upper guide member 286 closest to the cab 107 of the hi-rail vehicle. The horizontal support beam 294 provides a secondary support for the lower brace or lower guide member 287 that extends closest to the cab 107 to support a load of the pivotal TOF sensor system 212 coupled to the proximal mobile track system 208.

Details of the ultrasonic rail testing apparatuses 109 and 109' are described herein to clarify functioning of the equipment housing assembly 102 in cooperation with the ultrasonic rail testing apparatuses 109 and 109', including a method of testing the rails 106A and 106B shown in FIGS. 11-21 that includes positioning the ultrasonic rail testing apparatuses 109 and 109', and specifically the RSUs 273A and 273B, from the stowed configuration 201I within the compartment 108 and 108' to the testing or deployed configuration 201F with the RSUs 273A and 273B in engagement the rails 106A and 106B extending therebelow. The ultrasonic rail testing apparatuses 109 and 109' are generally identically configured relative to the respective rail 106A and 106B, but are separate and independently operable. In the final configuration 201F, the independently actuatable ultrasonic rail testing apparatuses 109 and 109' provide that the RSUs 273A and 273B of the pods 204 or 206 associated with each rail testing apparatuses 109 and 109' remain centered on the respective rail 106A and 106B notwithstanding inconsistencies (e.g., disparity in wear) between the two rails 106A and 106B and/or the apparatuses 109 and 109'.

The description herein of the ultrasonic rail testing apparatus 109, also applicable to the ultrasonic rail testing apparatus 109', includes references to the X-axis, a Y-axis, and the Z-axis, as shown in FIG. 2. The X-axis extends laterally from the gauge side to the field side of a rail, such as rail 106A or 106B, or laterally from the center of the equipment housing assembly 102 toward the driver- or passenger-side thereof. The Y-axis extends longitudinally along a center of the rail. The Z-axis extends vertically from the rail towards the sky.

The carriage 202, which may be referred to as a sensor support, is movably coupled to the proximal mobile track system 208 and the distal mobile track system 210 in the compartments 108 and 108', as shown if FIG. 6. As discussed herein, the carriage 202 advances vertically along the Z-axis between the track systems 208 and 210. Further, each of the mobile track systems 208 and 210 advances in a lateral and horizontal direction along the X-axis and in a vertical direction along the Z-axis, thereby causing the carriage 202 coupled thereto to also travel in these directions.

The proximal mobile track system 208 comprises an inner gear track 336 and an outer gear track 338. Similarly, the distal mobile track system 210 comprises an inner gear track 340 and an outer gear track 342. The inner gear track 336 of the proximal mobile track system 208 and the inner gear track 340 of the distal mobile track system 210 face each other such that the carriage 202 is movably coupled therebetween. The carriage 202 includes a carriage Z-axis motor 344 that causes the carriage 202 to move vertically relative to the inner gear tracks 336 and 340 along the Z-axis.

The proximal mobile track system 208 and the distal mobile track system 210 travel in the vertical direction along the Z-axis. The outer gear track 338 of the proximal mobile track system 208 and the outer gear track 342 of the distal mobile track system 210 face away from each other (i.e., each of the tracks 338 and 342 face away from the carriage 202). Specifically, the outer gear track 338 is coupled to a Z-axis motor 346 via cogwheels or another suitable linkage to advance the proximal mobile track system 208 to move up and down in the vertical direction relative to the Z-axis motor 346, and the outer gear track 342 is coupled to a Z-axis motor 348 via cogwheels or another suitable linkage to advance the distal mobile track system 210 to move up and down in the vertical direction relative to the Z-axis motor 348. This vertical movement of the proximal mobile track system 208 and the distal mobile track system 210 causes the carriage 202 coupled thereto to also move vertically along the Z-axis.

Each of the proximal mobile track system 208 and the distal mobile track system 210 may further have associated therewith the X-axis motors 250 and 252, respectively, that cause the mobile track systems 208 and 210 to move laterally in the horizontal direction along the X-axis. For example, the proximal mobile track system 208 is coupled to the X-axis motor 250 via a ball and screw or other suitable mechanism, and the distal mobile track system 210 is coupled to an X-axis motor 252 via a ball and screw or other suitable mechanism. The X-axis motors 250 and 252 may be activated to cause the proximal mobile track system 208 and the distal mobile track system 210 to travel along the X-axis, thereby causing the carriage 202 to also move horizontally along the X-axis, such as between the inner section 232 and the actuation section 230 of the compartments 108 and 108'. As used herein, the X-axis motors 250 and 252 and the carriage Z-axis motors 244, and the Z-axis motors 346 and 348 may be referred to as sensor or RSU deployment motors.

The pivotable TOF sensor system 212 is pivotably coupled to the proximal mobile track system 208, as shown in FIG. 6. The pivotable TOF sensor system 212 is pivoted or deployed from a storage position 358I, shown in FIGS. 12 and 13, to an operating use position 358O, shown in FIGS. 14 and 15, prior to and during engagement with the rail 106A by the ultrasonic rail testing apparatuses 109 and 109'. The pivotable TOF sensor system 212 is a rail sensing system that is configured to maintain alignment between the pod 204 or 206 deployed form the compartments 108 and 108' and the rail 106A. When the proximal mobile track system 208 moves along the X-axis inward for storage, a stop 366 coupled to the pivotable TOF sensor system 212 hits the sheet metal portion 227 of the ultrasonic rail testing apparatus 109 such that in the storage position the proximal mobile track system 208 is closer to the gauge side relative to the pivotable TOF sensor system 212.

When the carriage 202 and the sensor pod (e.g., pod 204) coupled thereto is being used for the ultrasonic testing of a rail 106A or 106B, the pivotable TOF sensor system 212 is in the operating position 358O and is in line with the carriage 202, functioning to maintain alignment between the RSUs 273A and 273B of the pod 204 or 206 and the rail 106A. Indications by the pivotable sensor system 212 that the pivotable sensor system 212 is misaligned with the rail indicates that the RSUs 273A and 273B are similarly misaligned with the rail 106A. When the pivotable sensor system 212 indicates misaligned thereof relative to the rail 106A, a controller (e.g., a controller configured to control operation of the ultrasonic rail testing apparatus 109 housed in the compartment 116) may automatically reorient the carriage 202 such that the carriage 202 and the pivotable sensor system 212 are aligned with the rail 106A. The carriage 202 may be caused to move (e.g., inward or outward along the X-axis) such that the RSUs 273A and 273B properly aligned with the rail 106A correcting the misalignment between the pivotable sensor system 212 and the rail 106A. In the embodiment shown in FIGS. 20 and 21, the pivotable sensor system 212 is oriented in the operating position 358O to direct one or more lasers or lights toward a web of the rail 106A to determine a relative position of the pivotable sensor system 212 relative thereto.

The ultrasonic rail testing apparatus 109 may include homing devices to ensure that the RSUs 273A and 273B of the pods 204 and 206 and the pivotable sensor system 212 have a homing or "zero" point with respect to which relative movement is subsequently made to alter the position of the RSUs 273A and 273B. For example, the ultrasonic rail testing apparatus 109 may have a horizontal homing point sensor 380, shown in FIG. 6, that demarcates the outermost point along the X-axis (i.e., the field side) the carriage 202 is allowed to travel to. Similarly, the ultrasonic rail testing apparatus 109 may have a vertical homing point sensor 382, shown in FIGS. 6 and 11, that demarcates the uppermost point along the Z-axis the carriage is allowed to reach. The ultrasonic rail testing apparatus 109 may be homed or zeroed in each of the vertical and the horizontal directions prior to use of the carriage 202 and the pod 204 or 206 coupled thereto for testing of the rail 106A.

Figure 22:
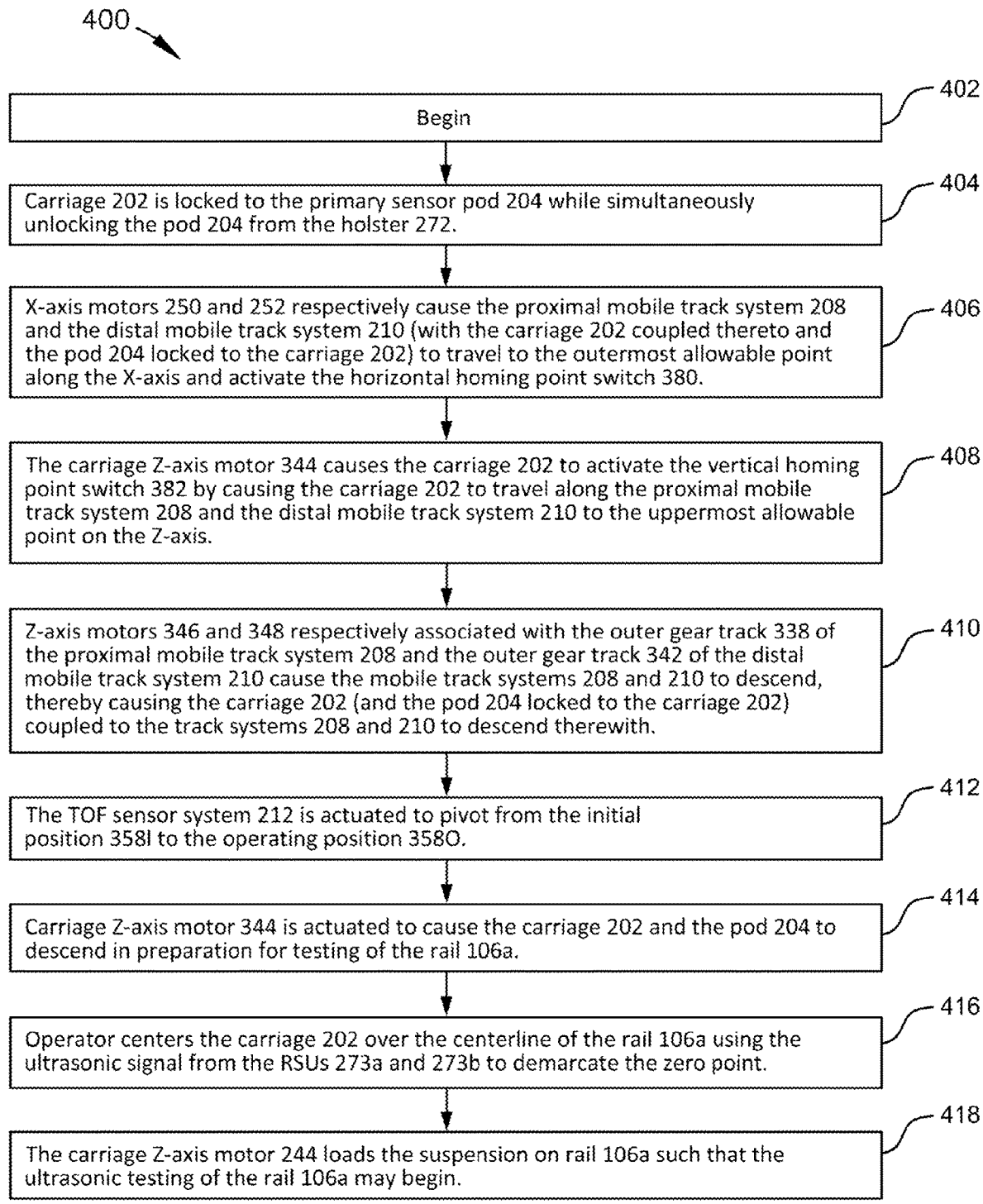
FIG. 22 is a flowchart outlining an example method of using the rail testing apparatus of FIG. 6 in the equipment housing assembly of FIG. 1.

FIGS. 11-21 illustrate an example method of operation of the ultrasonic rail testing apparatus 109, in an embodiment. FIG. 22 shows a flowchart outlining the method 400 of the steps for operating the ultrasonic rail testing apparatus 109 in the equipment housing assembly 102. Unless outlined herein, these steps are carried out autonomously or generally autonomously using one or more processors and machine-readable instructions executed thereby. The process 400 begins with the pod 204 in a stowed configuration 201I: (a) locked to the holster 272; and (b) unlocked from the carriage 202, as shown in FIG. 8.

At step 402, the track testing system 100, including the hi-rail vehicle 104 coupled to the equipment housing assembly 102, is positioned on the rails 106A and 106B and the method 400 for operating the ultrasonic rail testing apparatus 109 begins. At step 404, the carriage 202 is locked to the primary sensor pod 204 while simultaneously unlocking the primary sensor pod 204 from the holster 272.

At steps 406 and 408, the ultrasonic rail testing apparatus 109 is zeroed in each of the horizontal and vertical directions relative to the compartment 108. Specifically, at step 406 the X-axis motors 250 and 252 respectively cause the proximal mobile track system 208 and the distal mobile track system 210 to advance from the inner section 232 to the actuation section 230 of the compartments 108, with the carriage 202 coupled thereto and the pod 204 locked to the carriage 202. The mobile track systems 208 and 210 travel to the outermost allowable point along the X-axis toward the field side to activate the horizontal homing point switch 380. Similarly, at step 408 shown in FIG. 11, the carriage Z-axis motor 344 causes the carriage 202 to activate the vertical homing point switch 382 by causing the carriage 202, now positioned in the actuation section 230, to travel along the proximal mobile track system 208 and the distal mobile track system 210 to the uppermost allowable point along the Z-axis. In an embodiment, step 408 may occur prior to step 406 such that the carriage 202 first travels to the uppermost allowable point on the Z-axis within the inner section 232 and then travels to the outermost allowable point on the X-axis from the inner section 232 to the actuation section 230.

Figure 13:
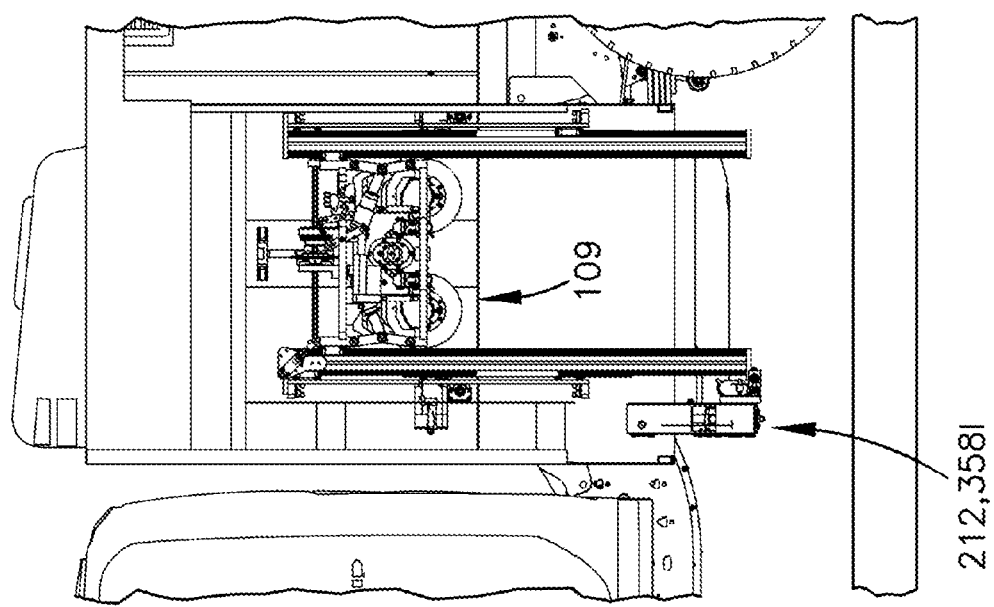
FIG. 13 is a plan view of the rail testing apparatus shown in FIG. 6, showing the mobile track system lowered, as shown in FIG. 12.
Figure 12:
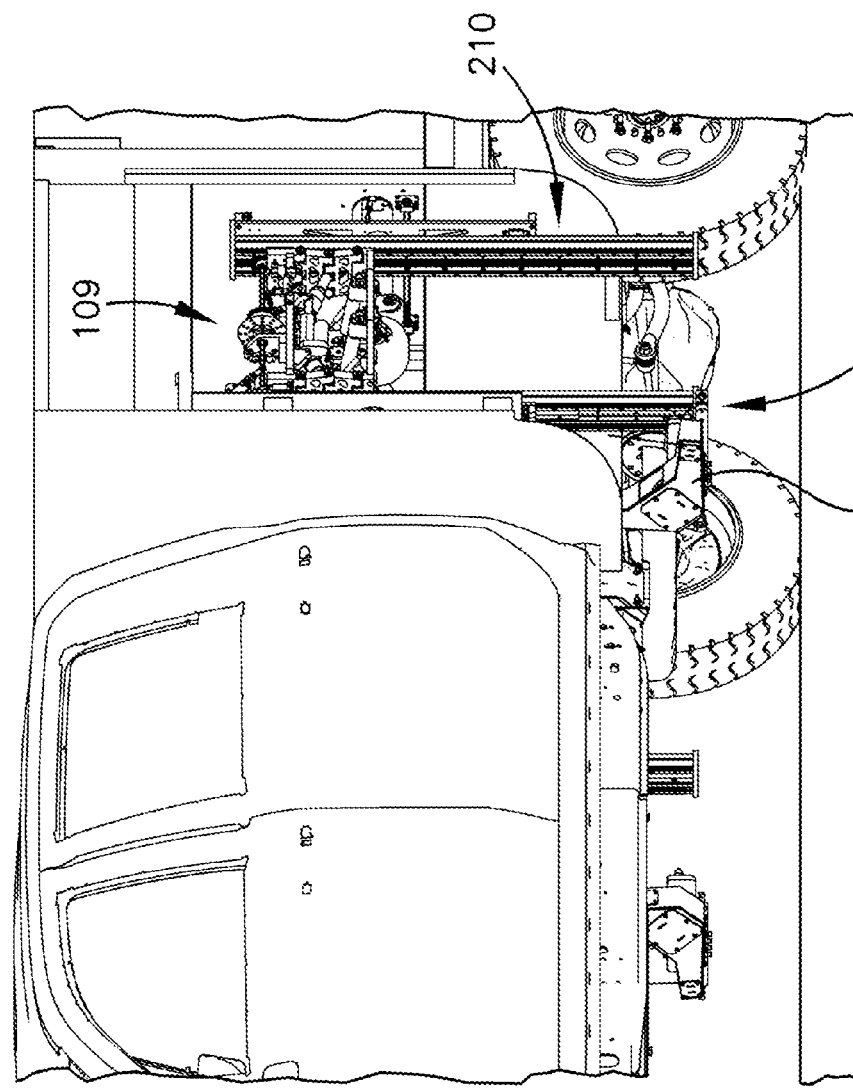
FIG. 12 is a perspective view of the rail testing apparatus shown in FIG. 6, showing the mobile track system lowered with the carriage and the first RSU pod coupled thereto.

At step 410 shown in FIGS. 12 and 13, the Z-axis motors 346 and 348 respectively associated with the outer gear track 338 of the proximal mobile track system 208 and the outer gear track 342 of the distal mobile track system 210 cause the mobile track systems 208 and 210 to descend within the actuation section 230, thereby causing the carriage 202 (and the pod 204 locked to the carriage 202) coupled between the mobile track systems 208 and 210 to descend therewith.

Figure 15:
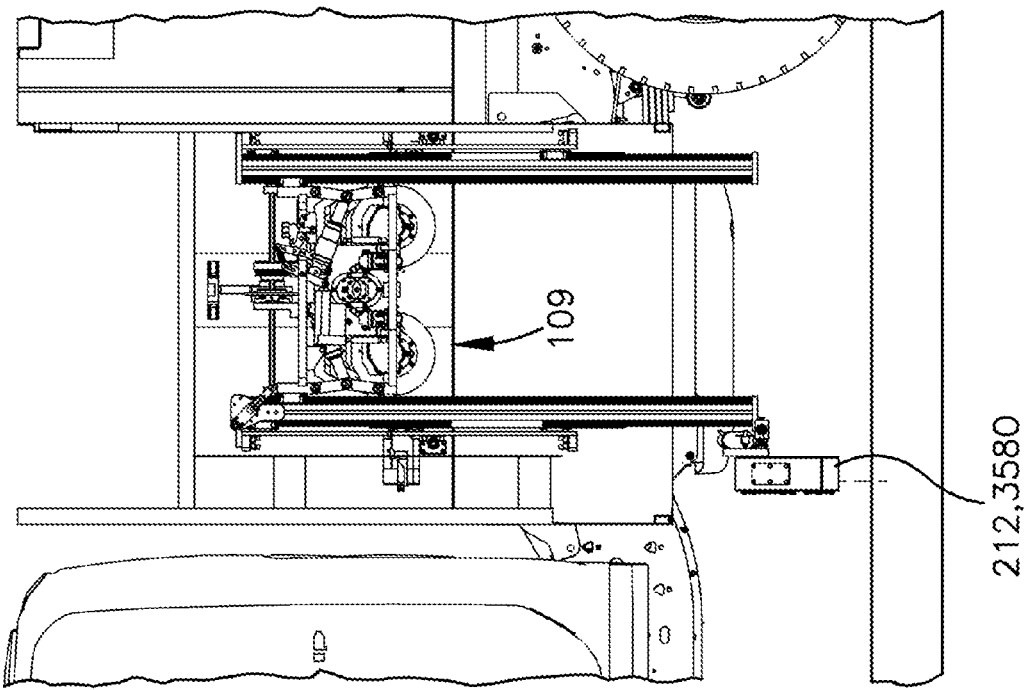
FIG. 15 is a plan view of the rail testing apparatus shown in FIG. 6, showing the TOF sensor pivoted to the operating position, as shown in FIG. 14.
Figure 14:
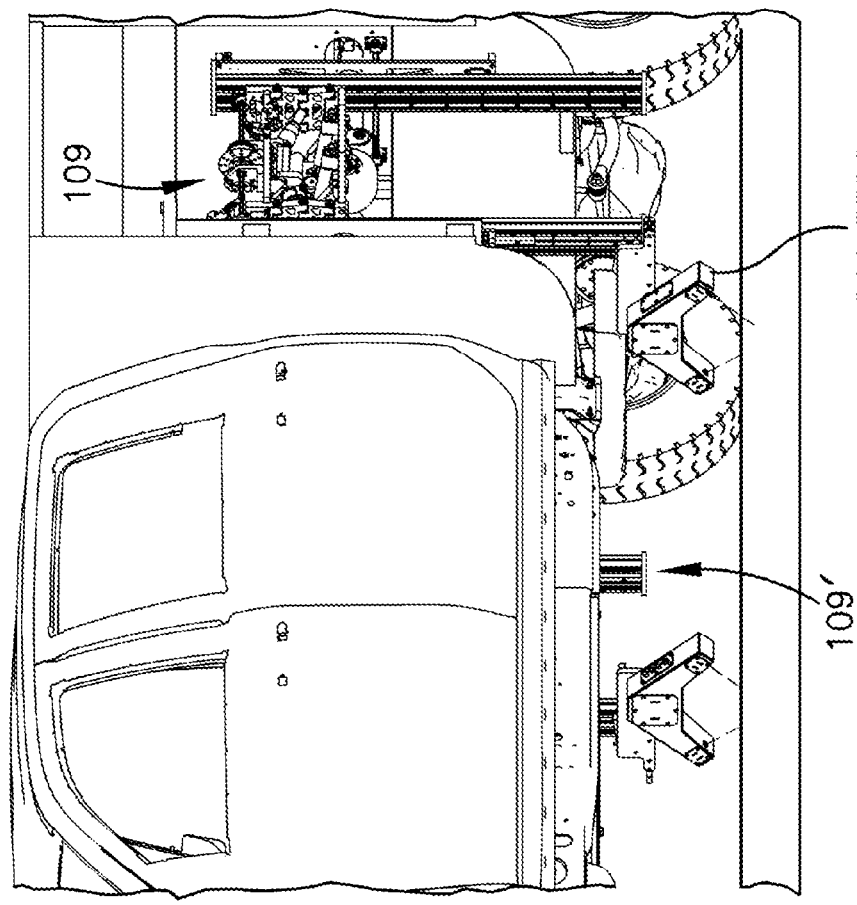
FIG. 14 is perspective view of the rail testing apparatus shown in FIG. 6, showing TOF sensor system pivoted to an operating position.

At step 412 shown in FIGS. 14 and 15, the TOF sensor system 212 is actuated to pivot or deploy from the initial position 358I to the operating position 358O.

Figure 17:
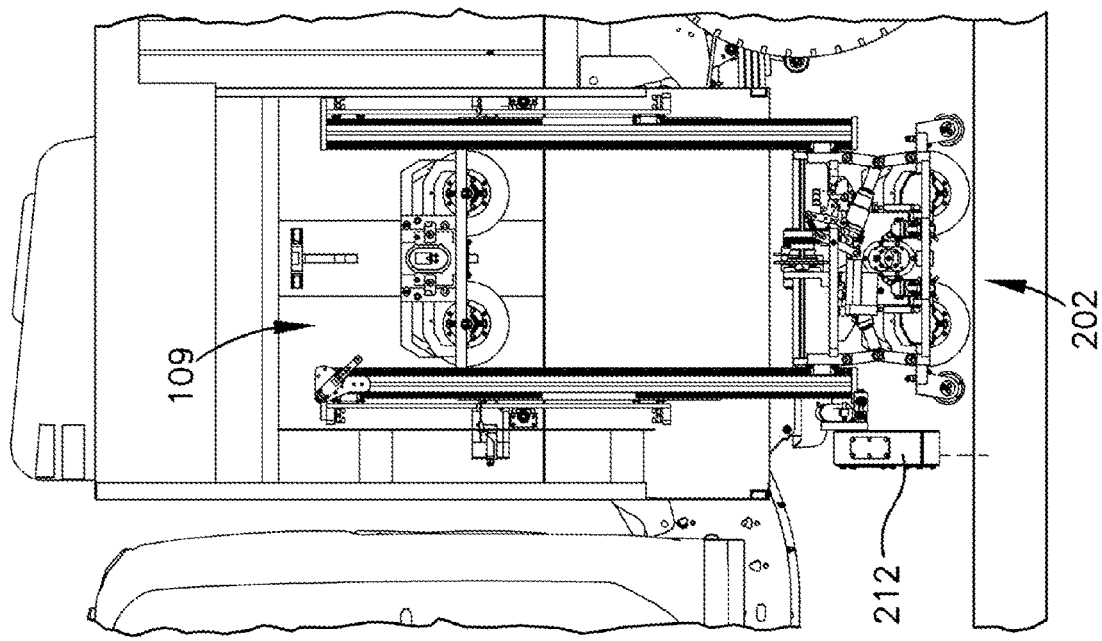
FIG. 17 is a plan view of the rail testing apparatus shown in FIG. 6, showing the carriage with the first RSU pod coupled thereto lowered relative to the mobile track system, as shown in FIG. 16.
Figure 16:
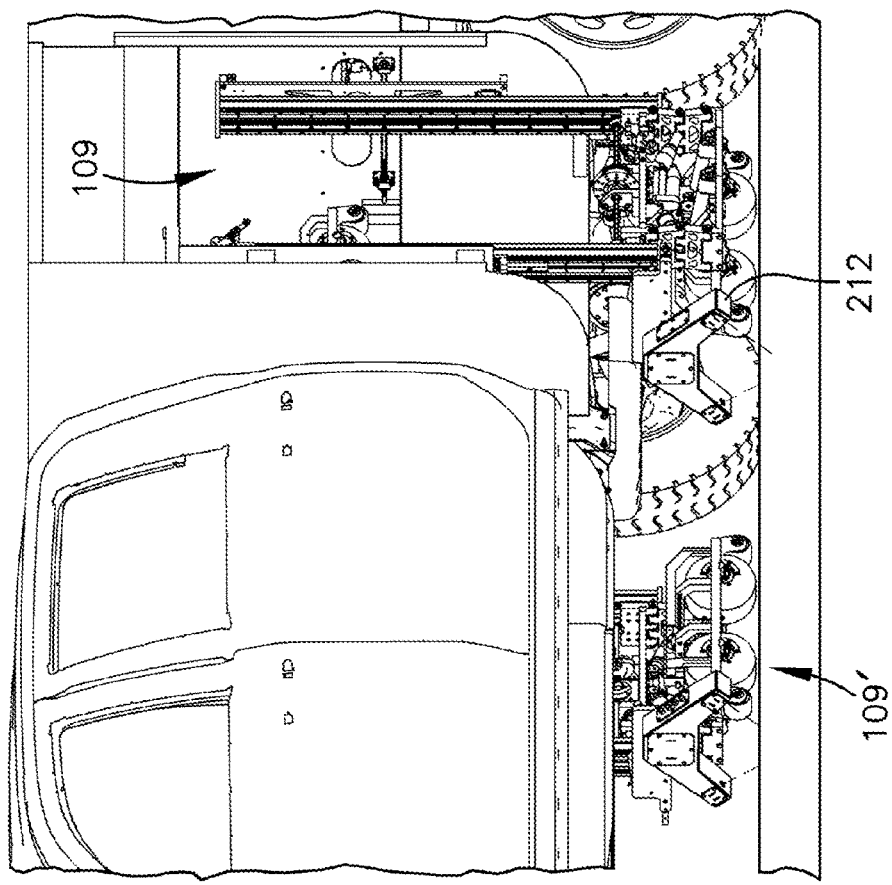
FIG. 16 is a perspective view of the rail testing apparatus shown in FIG. 6, showing the carriage with the first RSU pod coupled thereto lowered relative to the mobile track system.

At step 414 shown in FIGS. 16 and 17, the carriage Z-axis motor 344 is actuated to cause the carriage 202 and the pod 204 coupled thereto to descend to deploy below the compartment 108 and toward the rail 106A in preparation for testing of the rail 106A.

Figure 19:
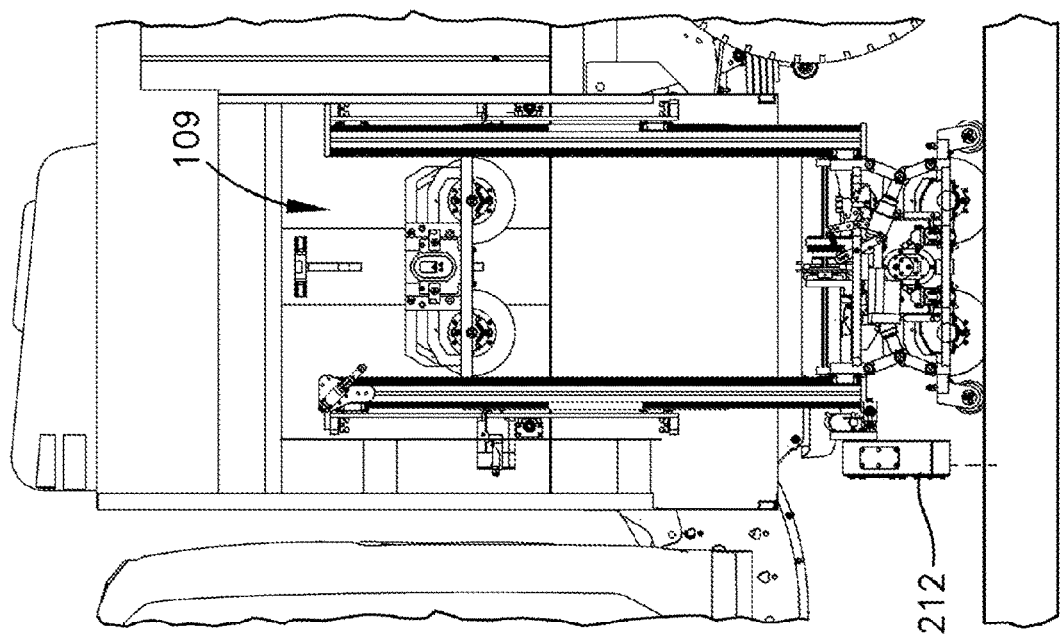
FIG. 19 is a plan view of the rail testing apparatus shown in FIG. 6, showing the carriage with the first RSU pod coupled thereto lowered and centered relative to the rail, as shown in FIG. 18.
Figure 18:
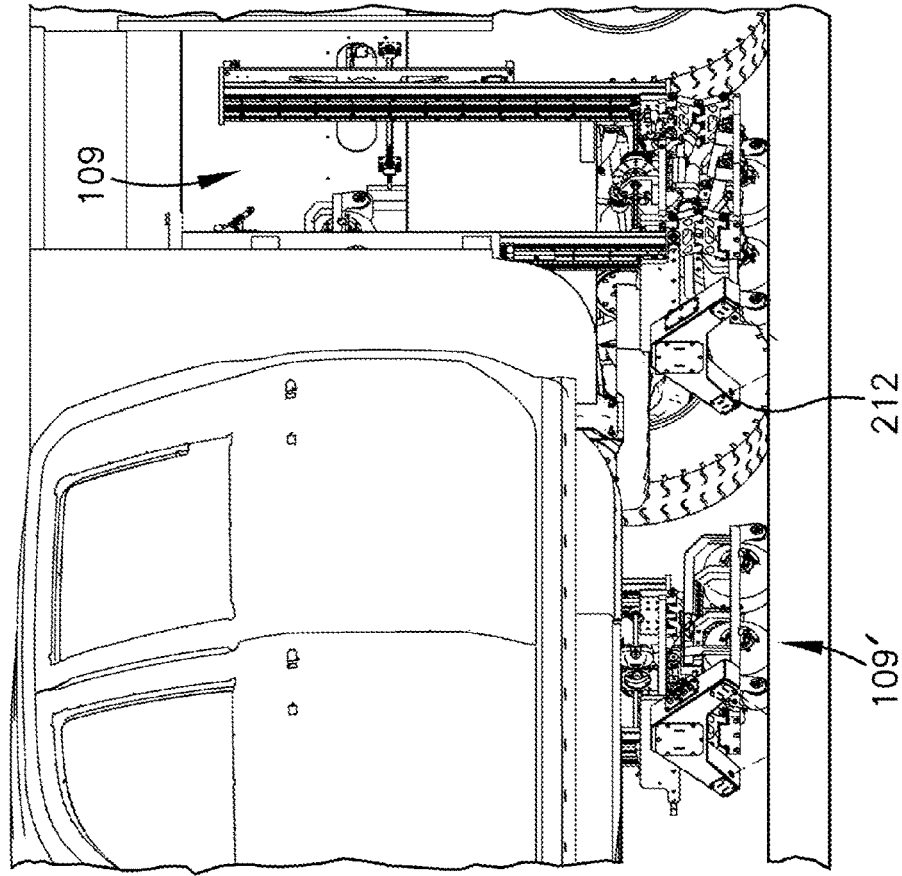
FIG. 18 is a perspective view of the rail testing apparatus shown in FIG. 6, showing the carriage with the first RSU pod coupled thereto lowered and centered relative to a rail.

At step 416 shown in FIGS. 18 and 19, an operator is able to center the carriage 202 over the centerline of the rail 106A using the ultrasonic signal from the RSUs 273A and 273B. This point may serve as the zero point for the RSUs 273A and 273B. This step may need to be carried out only once (e.g., at the start of testing each day), as thereafter, the ultrasonic rail testing apparatus 109, with the control systems coupled thereto, may take over to maintain alignment of the RSUs 273A and 273B and the rail 106A autonomously.

At step 418 shown in FIGS. 20 and 21, the carriage Z-axis motor 344 loads RSUs 273A and 273B of the ultrasonic rail testing apparatus 109 in alignment with and onto the rail 106A in the testing configuration 201F, such that the ultrasonic testing of the rail 106A may begin. The artisan will understand that the ultrasonic rail testing apparatus 109' for testing the rail 106B may be configured for testing the rail 106B in much the same way.

The hi-rail vehicle 104 may now drive on the rails 106A and 106B on its flanged wheels. Any float in these flanged wheels may be automatically corrected by the rail testing apparatus 109 and/or 109' such that the RSUs 273A and 273B remains centered on the rails 106A and/or 106B for the duration of the test. The steps may be reversed to retract the rail testing apparatus 109 and 109' when not in use.

Components that support operation of the track testing system 100 and the ultrasonic rail testing apparatuses 109 and 109' in the compartments 108 and 108' are housed in the compartments 110, 112, 114, 116, and 117 detailed herein.

Figure 23:
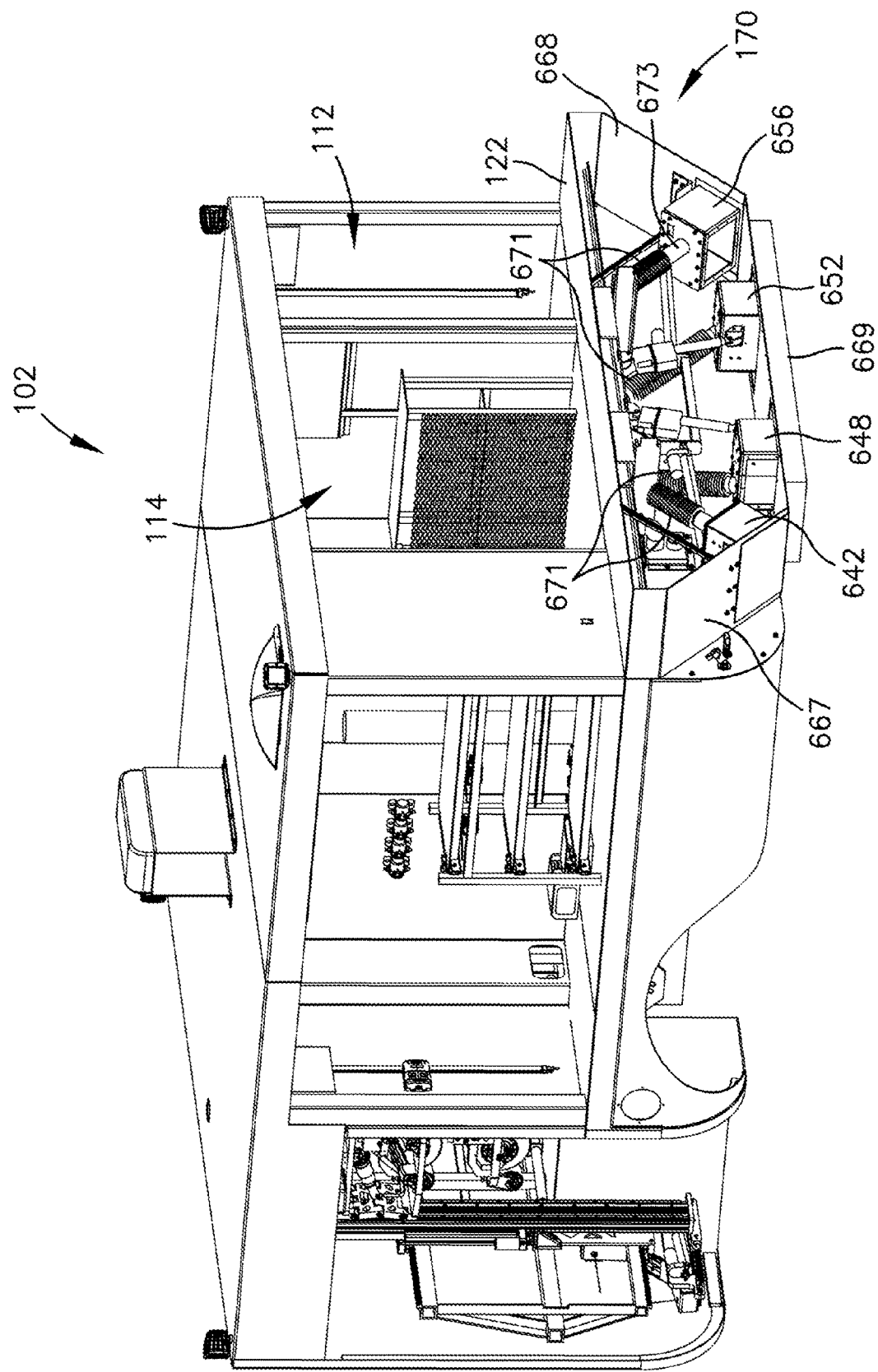
FIG. 23 is a perspective view of a driver side of the equipment housing assembly of FIG. 1 with doors removed from the compartments to show the rail testing apparatus in a storage configuration and a shelf unit configured to contain a power distribution and control system, and a rear-facing panel and doors removed from the imaging system compartment to show the imaging system therein in a storage configuration. The door compartments and the cooling unit are removed from the covering.
Figure 24:
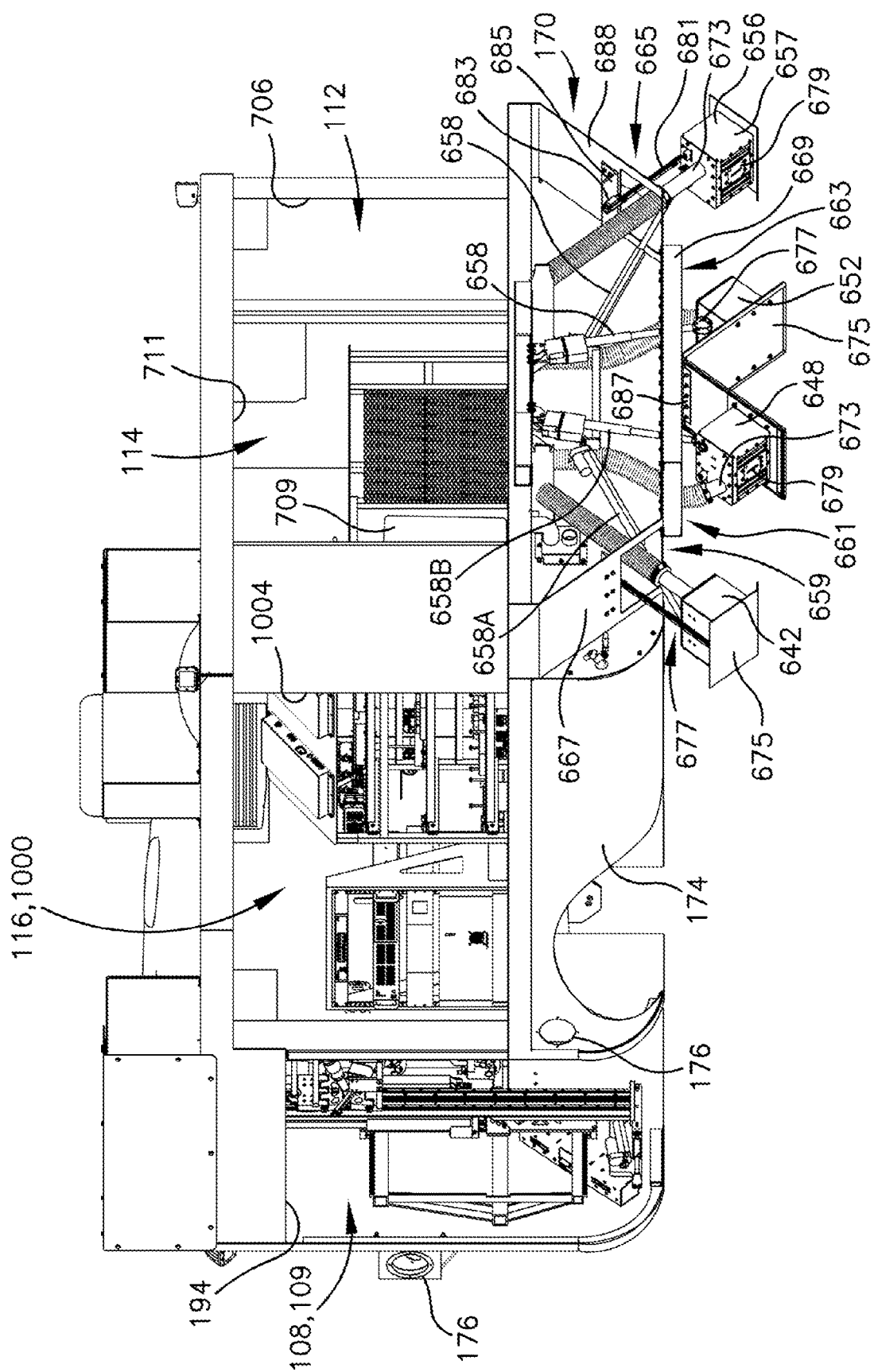
FIG. 24 is a perspective view of the driver side of the equipment housing assembly similar to that shown in FIG. 23, with the imaging assemblies deployed from the imaging system compartment and including the power distribution and control system on the shelf unit in a control system compartment and a tank for storing fluids in an auxiliary system compartment.

The compartment 110 houses a vision testing system comprising cameras for inspecting railroad tracks. The lower rear compartment or imaging system compartment 110, as shown in FIGS. 23 and 24, is configured to house or store the imaging system 170 and deploy the imaging system 170 therefrom. The imaging system 170 is a line-scan vision system having at least one imaging assembly 642, 648, 652, and 656. As shown, the imaging assemblies 642, 648, 652, and 656 each include a camera, and may include at least one light for imaging the rails 106A and/or 106B of the railway track. In a preferred embodiment, each imagining assembly 642, 648, 652, and 656 includes an imaging casing or housing 657 that houses the camera and/or the at least one light associated with the camera. The housing of each imaging assembly 642, 648, 652, and 656 may be referred to as a camera mount. A linear actuator 658, which may also be referred to as a camera mount motor, is connected between the camera housing 657 and an actuator support in the compartment 110. The actuator 658 is operable for selectively deploying the respective imaging assembly 642, 648, 652 and 656 from a stored position within the compartment 110 shown in FIG. 23 to a deployed position that positions the imaging assembly 642, 648, 652, or 656 such that the camera and/or the at least one light are positioned to record images of at least a portion of rail 106A and/or 106B or the track right of way as the hi-rail vehicle 104 advances along the railroad track. The imaging assemblies 642, 648, 652 and 656 communicate the images collected in real-time.

The imaging assemblies 642, 648, 652, and 656 may operate in conjunction with the ultrasonic rail testing systems 109 and 109' by communicating the images of the rail 106A and/or 106B of the railway track from the gauge and field sides thereof.

In the embodiment shown, the compartment 110 is an enclosed compartment formed with a plurality of openings 659, 661, 663, and 665 positioned on a bottom surface of the compartment 110 through which the imaging assemblies 642, 648, 652, and 656 are deployable to position the cameras and/or lights of the imaging system 170 to record images of the rails 106A and 106B and to communicate the recorded images of rails 106A and 106B to an image processing system. The compartment 110 extends from the driver side to the passenger side of the rearward end of the equipment housing assembly 102 and from at least the field side of the rail 106A to the field side of the rail 106B. In one embodiment, a top surface of the compartment 110 is connected to a lower surface of the deck 122 or is integral with the deck 122. In another embodiment, the compartment 110 is secured at a rearward end of the equipment housing assembly 102 such that rear compartments 112 and 114 are accessible and not obstructed by compartment 110. In one embodiment, the compartment 110 is positioned such that the imaging system 170 is positioned below the level of the deck 122.

As shown in the drawings, the compartment 110 includes an inwardly and downwardly sloped driver side panel 667 and an inwardly and downwardly sloped passenger side panel 668. The sloped panels 667 and 668 are each directed inward at a downward angle toward the ground, and a bottom panel 669 extends between the sloped panels 667 and 668. In an embodiment, the compartment 110 includes the openings formed in the panels 667, 668, and 669: the first opening 659 in the sloped driver side panel 667 configured such that when the first imaging assembly 642 therein is deployed therefrom the camera records and communicates images from the field side of the rail 106A; the second opening 661 in the bottom panel 669 of the compartment 110 is configured such that when the second imaging assembly 648 therein is deployed therefrom or pivotally opened the camera records and communicates images from the gauge side of the rail 106A; the third opening 663 in the bottom panel 669 of the compartment 110 is configured such that when the third imaging assembly 652 is deployed therefrom or pivotally opened the camera records and communicates images from the gauge side of the rail 106B; and the fourth opening 665 in the sloped passenger side panel 668 is configured such that when the fourth imaging assembly 656 is deployed therefrom the camera records and communicates images from the field side of the rail 106B.

The imaging assemblies 642, 648, 652, and 656 are each coupled to a respective bellows or air flow conduit 671 that is configured to transport air into the imaging assemblies such that a positive air pressure is maintained in each of the imaging assemblies 642, 648, 652, and 656. In an embodiment, each bellows 671 is formed from a flexible, extensible tubing that extends and retracts as the imaging assemblies 642, 648, 652, and 656 are deployed and retracted. Each bellows 671 is secured to a coupler 673 extending from the imaging assembly 642, 648, 652, and 656 and is in flow communication with the compartment 116 via a fan system (not shown).

Each of the imaging assemblies 642, 648, 652, and 656 is extended and retracted by the linear actuators 658 through the respective opening 659, 661, 663, and 665. In an embodiment, the housing that forms each of the imaging assemblies 642, 648, 652, and 656, or a panel 675 coupled thereto, may form a seal around the respective opening 659, 661, 663 or 665 when the imaging assembly 642, 648, 652, or 656 is retracted through the openings 659, 661, 663 or 665 and into the compartment 110.

In an embodiment, the imaging assemblies 642 and 656 that are positioned at each end of the compartment 110 are extended or deployed and retracted by linear actuators 658a pivotally coupled to clevis brackets 677 secured to the imaging assembly 642 and 656. The imaging assemblies 642 and 656 are advanced through the respective opening 659 and 665 at an angle substantially perpendicular to the respective sloped panel 667 and 668 such that a camera 679 housed in each imaging assembly 642 and 656 is directed or angled to capture an image of the respective field side of the rails 106A and 106B. The imaging assemblies 642 and 656 are each coupled to a track 681 that advances through a linear bearing 683 secured to an angle plate 685 secured to an inner surface of the respective sloped panel 667 or 668 to guide the imaging assembly 642 or 656 into the deployed or retracted positions. In the deployed position, the cameras 679 of the imaging assemblies 642 and 656 extend on the field sides of the rails 106A and 106B and are angled approximately 45° downward relative to the Z-axis and toward the field side of the rail 106A and 106B.

In an embodiment, the imaging assemblies 648 and 652 that are positioned in a center or inner portion of the compartment 110 are each secured to an inner surface of a respective cover panel 675 that is hingedly coupled to the lower surface of the bottom panel 669 of the compartment 110. Cover panel 675 may also be referred to as a portion of the camera mount. Actuators 658b pivotably coupled to clevis brackets 677 secured to the imaging assemblies 648 and 652 extend or deploy to pivot the panels 675 approximately 45° downward about hinges 687 to advance the imaging assemblies 648 and 652 coupled thereto into the deployed position, such that the cameras 679 housed in the imaging assemblies 648 and 652 extend between the rails 106A and 106B and the cameras 679 are directed or angled approximately 45° downward to capture an image of the gauge side of the respective rail 106A and 106B. The hinges 687 pivotally couple each of the cover panels 675 on inside adjacent edges thereof approximately in a center of the bottom panel 669.

Figure 25:
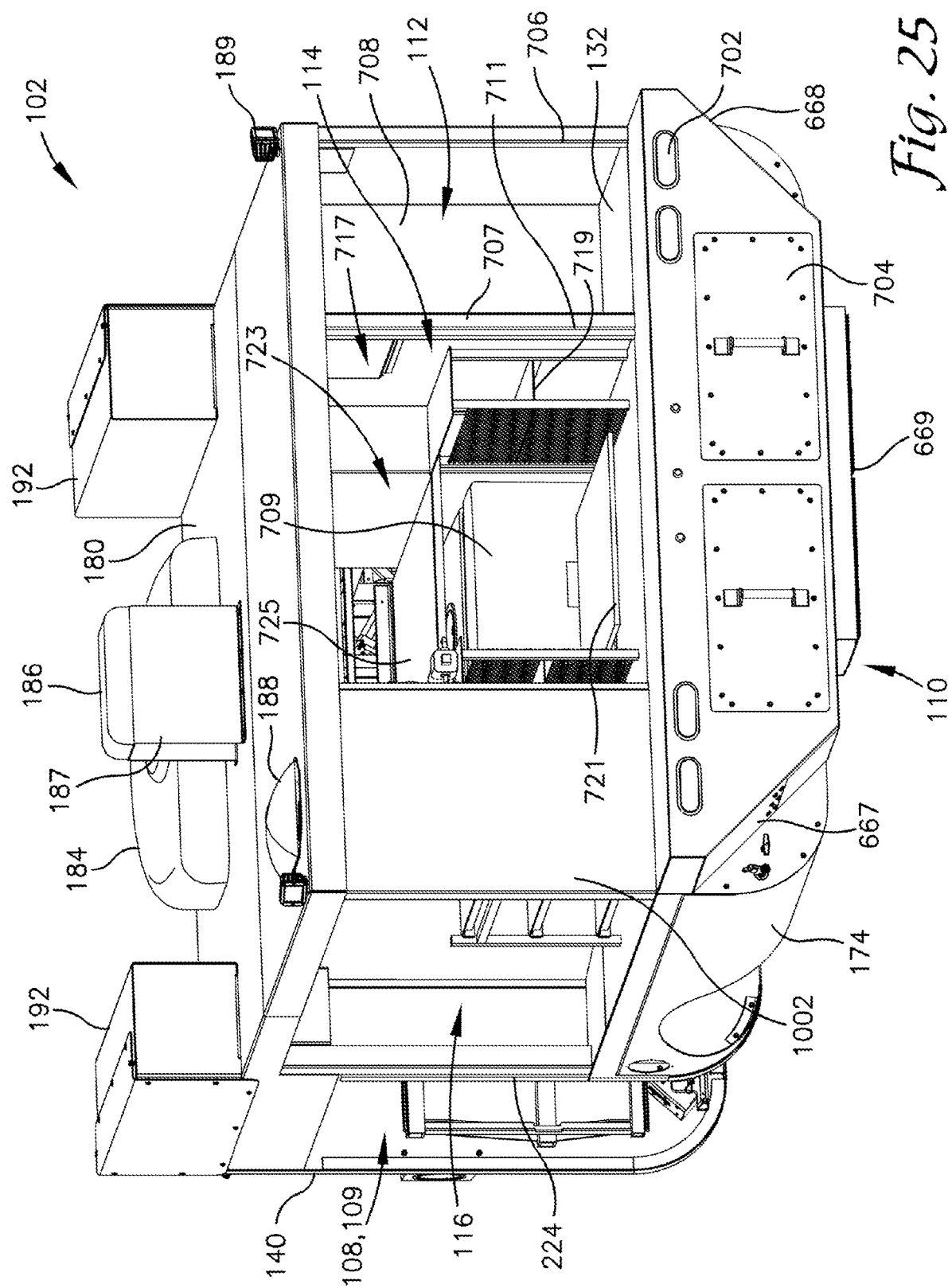
FIG. 25 is a rear perspective view of the equipment housing assembly shown in FIG. 1 with the doors to the compartments removed.

As shown in FIG. 5, a conduit 689 extends between the compartment 110 and aperture 700 under the deck 122 to communicatively and/or electrically connect the imaging system 170 of the compartment 110 to the systems housed in the compartment 116 and/or other systems, such as the ultrasonic rail testing apparatuses 109 and 109'. As shown in FIG. 25, the compartment 110 may be further configured to include rear vehicle lights 702, such as those required by the U.S. Department of Transportation, one or more openable or removable doors 704 to access the imaging system 170, a bumper structure (not shown) that provides a buffer in the event of a collision, a hitch (not shown) and/or other supplemental equipment or accessories.

The rear corner compartment or rear passenger side compartment or LiDAR compartment 112 is configurable to house components of a light detection and ranging technology system, also referred to as a LiDAR system, not shown, for imaging and evaluating railroad tracks and track right of ways. As shown in FIGS. 24 and 25, the compartment 112 is positioned in the rear passenger side corner of the equipment housing assembly 102 and is formed with an opening 706 facing rearward relative to the equipment housing assembly 102 configurable to support an openable door 190 therein. The LiDAR system may include cameras or lights positioned on an exterior of the equipment housing assembly 102. In FIG. 3, the compartment 112 shares a wall 707 with neighboring center rear compartment 114 and shares a wall 708 on a forward end thereof with the passenger side compartment 117. The walls extend from the deck 122 to the covering 180, enclosing the compartment 112.

The compartment 114 is configured for storage (e.g., stores tanks filled with water or washer fluid for conducting ultrasonic testing. The center rear compartment or the main auxiliary system compartment 114 is configured to house one or more rail spraying systems to support operations of the ultrasonic rail testing apparatuses 109 and 109' that include the nozzles (not shown) flow connected to a fluid supply system in the compartment 114, including one or more tanks 709, shown FIGS. 24 and 25, that contain water or a washer fluid, one or more filters that remove solids from the water or washer fluid, and one or more pumps, which may include one or more solenoid assemblies, for pumping the fluid to the ultrasonic rail testing apparatuses 109 and 109'. The compartment may also be configured for other storage, including storage of maintenance-of-way equipment and/or employee belongings. The compartment 114 is centrally and rearwardly positioned and an opening 711 is formed therein configured to support an openable door 190 which faces rearward with respect to the equipment housing assembly 102. As best shown in FIG. 3, the compartment 114 is bounded on the driver side by inside wall 713 shared with the driver side compartment 116 and on the passenger side by the wall 707 shared with the rear corner LiDAR compartment 112 and inside wall 715 of the passenger side compartment 117. A forward end of compartment 114 may be open to or continuous with the inner sections 232 of forward compartments 108.

In one embodiment, the compartment 114 is configured to provide the one or more fluid storage tanks 709 in a central position to evenly distribute the load thereof and provide stability, especially when the one or more tanks 709 are fully loaded with fluid. The fluid may be used to improve the operation of the rail testing equipment, such as for spraying on the rails 106A and 106B to improve sensor readings of the RSUs 273A and 273B. The compartment 114 is accessible and equidistant to each of the ultrasonic rail testing apparatuses 109 and 109' that are located on opposite sides of the equipment housing assembly 102 in the forward compartments 108 and 108' and configured such that the tanks 709 may be positioned centrally between the ultrasonic rail testing apparatuses 109 and 109' such that a pressure of the fluid to the nozzles is approximately equal, and a load on the one or more pumps that advance the fluid to the nozzles is approximately equal.

A first area 717 of the compartment 114 may include one or more accessory shelf units, including side shelves 719 and a center support shelf 721 for elevating systems or components of systems.

A second or center section 723 of the compartment 114 is positioned in the center of the equipment housing assembly 102 and is accessible through the opening 711 of the compartment 114. The second section 723 includes a horizontally extending platform 725 extending between the inside wall 713 of the driver side compartment 116 and the inside wall 715 of the passenger side compartment 117 for storage above or below the platform 725. In one embodiment, the platform 725 is a structural component coupled to the wall 713 of the driver side compartment 116 and the wall 715 of the passenger side compartment 117 to stabilize and provide support thereto. In one embodiment, a portion of the wall 713 adjacent to the platform 725 includes an observation or circulation or communication opening 727 formed therein extending at least partially between the covering 180 and the platform 725. The platform 725 does not extend between the forward compartments 108 or into the first area of the compartment 114. One or more pumps, not shown, are positioned within compartment 114 and flow connected to the one or more tanks 709 and operable by power delivered from a power supply unit, as discussed hereafter, for operating the pump for pumping fluid in the tanks 709 through fluid supply lines to dispense fluid between the RSUs 273A and 273B and the respective rails 106A and 106B engaged thereby.

The equipment housing assembly 102 disclosed herein includes or has associated therewith electronics, such as, a computing system, data servers, one or more processors, controllers or the like, housed in compartment 116. The electronics are used to control and/or modify the operation of the various components of the railroad track testing equipment, including the ultrasonic rail testing apparatuses 109 and 109' (e.g., to direct motor and/or actuator function) and the imaging system 170. In some example embodiments, a computer or processor or processors may be configured through particularly configured hardware, such as an application specific integrated circuit (ASIC), field-programmable gate array (FPGA), etc., and/or through execution of software to allow the ultrasonic rail testing apparatuses 109 and 109' and the imaging system 170 to function in accordance with the disclosure herein. Likewise, at least the ultrasonic rail testing apparatuses 109 and 109' may make use of a graphical user interface, or another type of machine-to-human interface, to carry out embodiments of the functions and features described herein. The processor may include any processor used in smartphones and/or other computing devices, including an analog processor (e.g., a Nano carbon-based processor). In certain embodiments, the processor may include one or more other processors, such as one or more microprocessors, and/or one or more supplementary co-processors, such as math co-processors.

Figure 26:
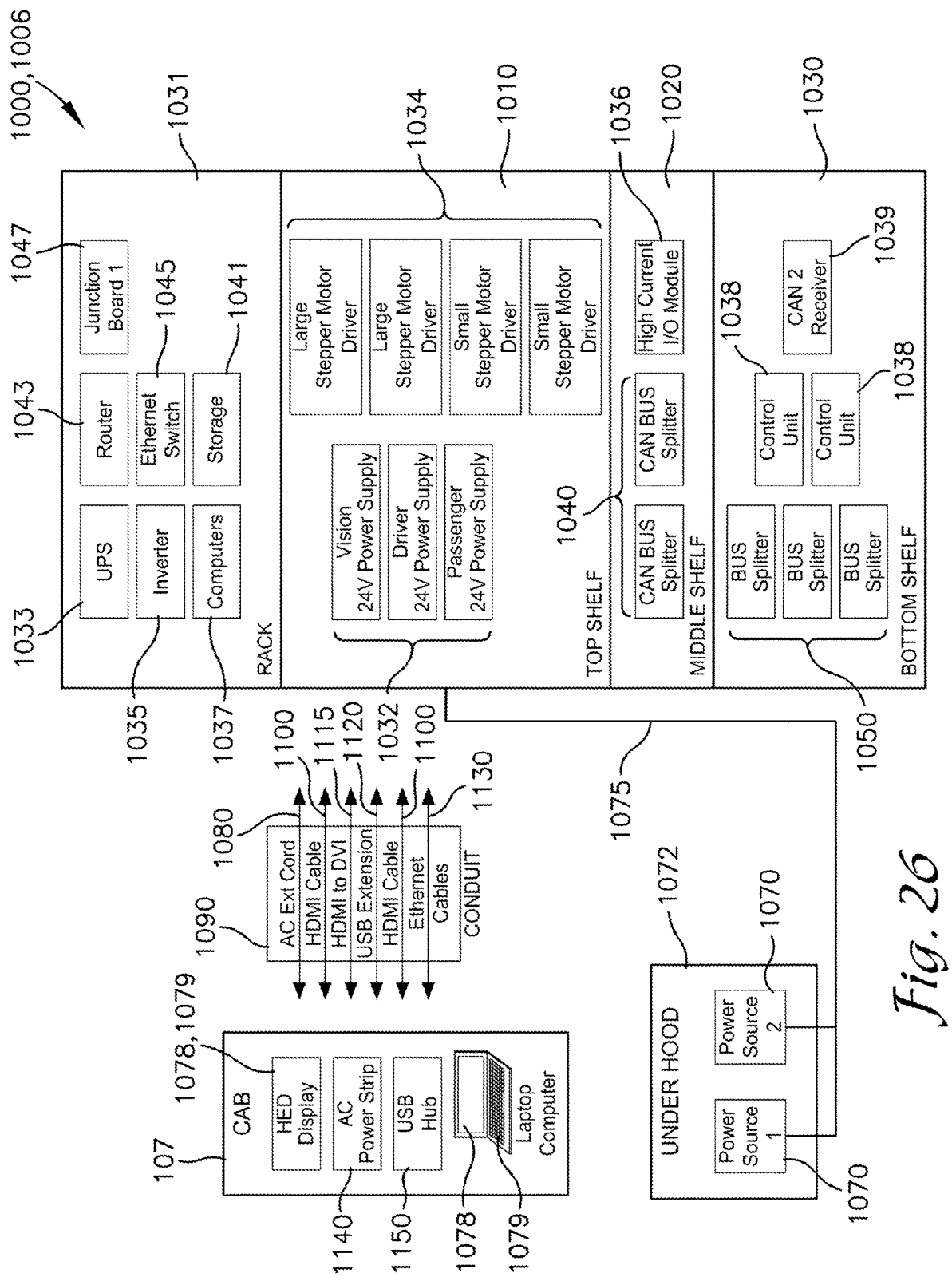
FIG. 26 is a schematic view of the power distribution and control system of the equipment housing assembly shown in FIG. 1, including a main conduit that connects power, audio, video and communications wiring to the cab of the hi-rail vehicle and a power conduit that supplies power to the equipment housing assembly.

The driver side or control system compartment 116 houses a power distribution and control system 1000 that controls the testing and imaging devices of the equipment housing assembly 102 and management of power supplied to the equipment housing assembly 102. The compartment 116 extends along the driver side of the equipment housing assembly 102 from rearward of the sidewall 224 of the forward driver side compartment 108 to a rear wall 1002, and includes an opening 1004 formed in the compartment 116 on the driver side of the equipment housing assembly 102 for an openable door 190. As shown in FIG. 26, the compartment 116 includes one or more shelf units 1006 to contain the power distribution and control system 1000 and other associated systems housed therein. In an embodiment, the shelf unit 1006 includes a first or top shelf 1010, a second or middle shelf 1020, a third or bottom shelf 1030, and a rack 1031 positioned on, in, or adjacent to the shelf unit 1006.

Components contained on the shelf unit 1006 may have a variety of arrangements. In an embodiment, the top shelf 1010 of the shelf unit 1006 includes one or more power supply units 1032 and a plurality of motor drivers 1034 to drive the motors, such as the X-axis motors 250 and 252 and the Z-axis motors 344, 346, and 348, to precisely position the ultrasonic rail testing apparatus 109 and 109' relative to the rails 106A and 106B and the linear actuators or motors 658 to precisely position the camera mounts 657 and cameras mounted thereon. In an embodiment, a middle shelf 1020 of the shelf unit 1006 includes an input/output (I/O)

module 1036 that may include a panel and that connects and manages communications between the components in the equipment housing assembly 102, including, for example, collection and transfer of data, management of power loads, and connection of the components to one or more controllers or control units 1038. In an embodiment, a third shelf 1030 includes the one or more control units 1038 and may include a receiver 1039 configured to connect a remote control thereto such that an operator is able to control the ultrasonic rail testing apparatuses 109 and 109' remotely. The shelf unit 1006 may further include communication and wiring components to facilitate interconnection and communication between the various equipment, components, and devices contained on the shelf unit 1006 and/or contained in the equipment housing assembly 102, such as control area network (CAN) modules 1040, bus splitters 1050, input/output (I/O) modules 1036, transmitters, receivers, heaters, lights, and sensors.

In an embodiment, the one or more power supply units 1032 in the compartment 116 are configured to be connected to one or more vehicle power sources 1070, such as chassis batteries typically located under a hood 1072 of the hi-rail vehicle 104, by at least one power supply cable or power supply cord 1075 extending under the deck 122 (FIG. 5). In one embodiment, the vehicle power sources 1070 comprise two separate batteries and separate power supply cords 1075 are provided to connect each battery 1070 to an inverter 1035 in the power distribution and control system to convert the direct current from the batteries 1070 into alternating current for use by the electrical components included in and connected to the power distribution and control system. In an embodiment, the power supply cable 1075 is connected to a power supply socket (not shown) connected to an electrical system of the hi-rail vehicle 104 to provide power to the one or more power supply units 1032. The one or more vehicle power sources or batteries 1070 provide power to the one or more power supply units 1032 which may provide power to one or more of the components in the equipment housing assembly 102.

Rack 1031 may include an uninterruptible power supply (UPS) 1033 for storing power for use in the event of a battery shutdown or failure, and the inverter 1035 for producing AC power to provide AC power to equipment in the equipment housing assembly 102, or to a display 1078, such as an HED display, and/or an input device 1079 positioned in the cab 107 of the hi-rail vehicle 104 via an AC extension cord 1080. The input device 1079 may include a touch screen pad, a keyboard, a mouse, or another foreseeable device that is configured to receive operator input to control functions of the equipment housing assembly 102. The display 1078 and the input device 1079 may be combined, such as in a laptop or a touchscreen device.

Rack 1031 may further include one or more computers or processors 1037 for processing image data from the imaging system 170, and for collecting and analyzing data from the rail testing systems 109, 109'. Storage 1041 may include solid state and/or hard disc drives in communication with the processors 1037 and accessible through a network in an network attached storage (NAS) arrangement. The storage 1041 collects, aggregates, and stores collected data for archival purposes and for additional review and analysis. Router 1043 and Ethernet switch 1045 are in communication with the processors 1037 and storage 1041 to allow access and communication via a local or wide area network connection. Junction boards 1047 facilitate the connection of power and communications wiring to the equipment in the rack 1031 and/or shelf units 1006. As used herein the one or more processors 1037 and control units or controllers 1038 may be embodied in a single computing device or multiple computing devices or computers including one or multiple processors 1037 and one or multiple controllers 1038.

Figure 27:
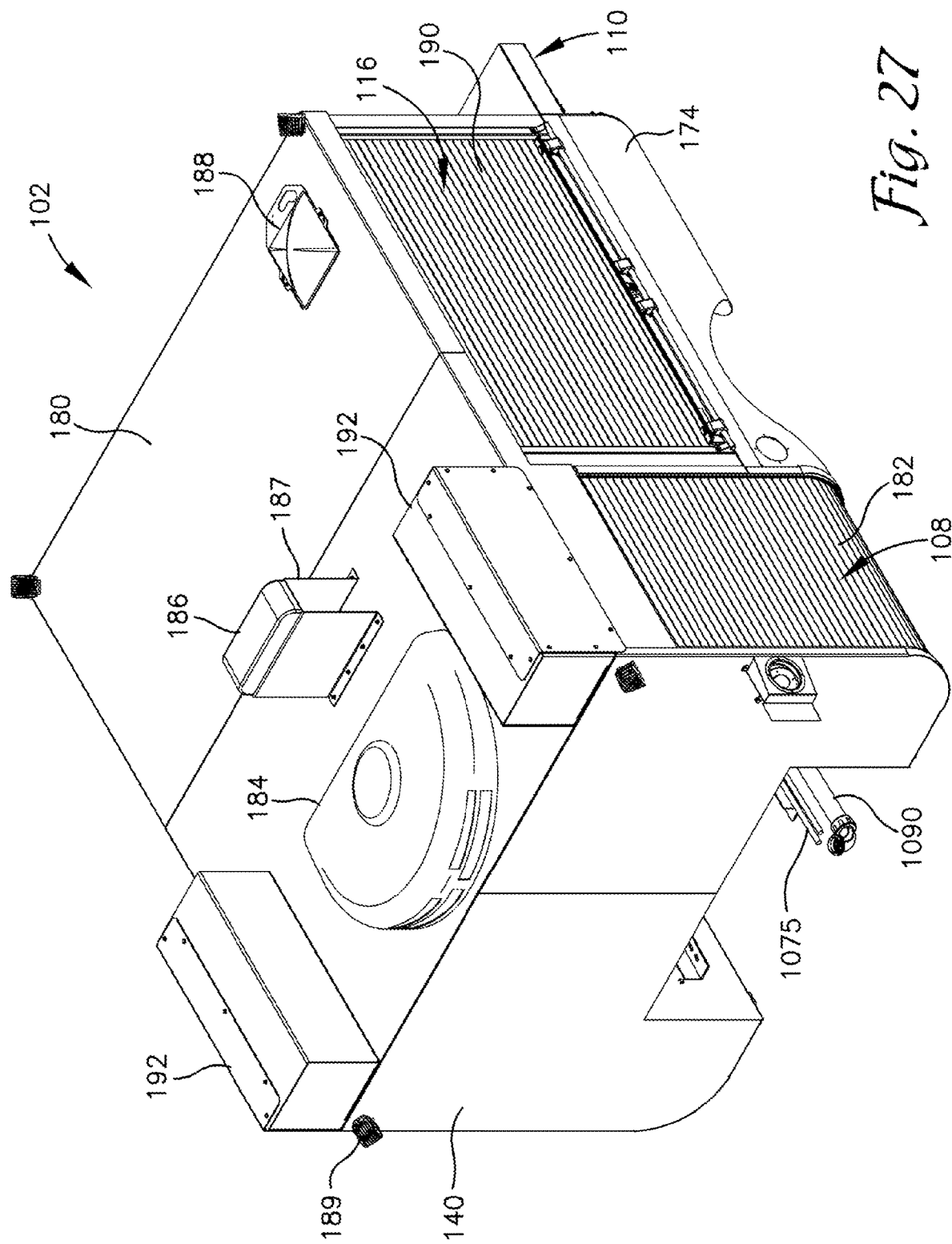
FIG. 27 is a front, perspective view of the equipment housing assembly shown in FIG. 1 and includes the main conduit and power supply cables extending therefrom.

FIGS. 26 and 27 shows a main conduit 1090 that extends from the equipment housing assembly 102 and is removably securable to the cab 107 of the hi-rail vehicle 104 and provides a channel through which power, audio, video, and communications wiring or cables extend to interconnect equipment and/or power sources in the equipment housing assembly 102 with equipment and/or power sources in the cab 107 of the hi-rail vehicle 104. In an exemplary embodiment the wiring extending in the main conduit 1090 includes at least the AC extension cord or return power supply cord 1080 for carrying AC power, an HDMI cable 1100 and 1115 for carrying audio and/or video signals, a USB extension cable 1120 for carrying computer communication signals, and an Ethernet cable 1130 for carrying high-speed computer communication signals. As used herein wiring or cables for transmitting audio or video signals may also be referred to as communications wiring or cables. At least one communications cable is connected at a first end to the one or more computers or processors 1037, and a second end of the at least one communications cable is removably couplable to a display 1078 and/or an input device 1079 located within the cab 107 of the hi-rail vehicle 104, and the at least one communications cable is sized to extend into the cab 107 of the hi-rail vehicle 104.

In one embodiment, the power, audio, video, and communications wiring or cables may be used to power an AC power strip 1140 (via the AC extension cord) to allow a user to power various AC equipment and devices in the cab 107; the display 1078 (via the HDMI cable); the input device 1079 (via the USB and/or Ethernet cables); a USB hub 1150 (via the USB cable) to allow a user to connect additional USB devices in the cab 107; and to provide power or to enable communication between other devices, components, and equipment in the cab 107 and devices, components, and equipment in the equipment housing assembly 102. In alternative embodiments the wiring extending through the main conduit 1090 may include additional HDMI cables for connecting additional monitors or displays in the cab 107, additional Ethernet cables for interconnecting additional computers in the cab 107, and additional USB or other video, power, and communications cables for connecting additional devices or equipment in the cab 107 with devices or equipment in the equipment housing assembly 102.

In the embodiment shown in FIG. 5, the main conduit 1090 extends from the compartment 116, under the deck 122, and into the cab 107. When the equipment housing assembly 102 is removed from the hi-rail vehicle 104, the one or more power supply cables 1075 are disconnected from the hi-rail vehicle battery or batteries and the individual cables (i.e., the power, audio, video, and communications cables) extending through the main conduit 1090 are disconnected from the equipment they are attached to, and the main conduit 1090, with the wiring extending therethrough, is disengaged from the hi-rail vehicle 104 such that the equipment housing assembly 102 with the power supply cables 1075 and the main conduit 1090 and enclosed wiring extending therefrom is installable on a second hi-rail vehicle with the wiring in place for connection to equipment in the cab 107 of the second vehicle 104. FIG. 27 shows an embodiment of the equipment housing assembly 102 having the main conduit 1090 and the at least one power supply cable 1075 extending therefrom for engagement with the hi-rail vehicle 104.

The passenger side compartment 117 shown in FIGS. 3 and 4 is positioned on the passenger side of the equipment housing and includes a wall 1200 extending between the forward passenger side compartment 108' and the compartment 117, the wall 708 extending between the corner rear compartment 112 and the compartment 117, and the wall 715 extending between the compartment 114 and the compartment 117. The compartment 117 has an opening 1210 formed therein configured to support an openable door 190 positioned to face the field side of the rail 106B. The walls 1200, 708, and 715 of compartment 117 extend from the deck 122 to the covering 180, enclosing and separating the compartment 117 from the other compartments of the equipment housing assembly 102. The compartment 117 is configurable for storage, including storage of employee belongings and/or other maintenance-of-way equipment, and/or may used to house other equipment foreseeable for use with the equipment housing assembly 102.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations. Not all steps listed in the various figures need be carried out in the specific order described.

What is claimed is:

1. An equipment housing assembly removably securable to a frame of a hi-rail vehicle operable to advance along first and second rails of a railroad track, the equipment housing assembly comprising:
   an equipment housing;
   at least one rail sensor operable to sense at least one property of at least one of the first and second rails as the hi-rail vehicle advances along the first and second rails, the at least one rail sensor mounted on a sensor support;
   at least one sensor deployment motor operably engaging the sensor support and operable to advance the sensor support between a retracted configuration relative to the equipment housing and a deployed configuration relative to the equipment housing, wherein when the sensor support is advanced to the deployed configuration, the at least one sensor is positioned to sense the at least one property of at least one of the first and second rails as the hi-rail vehicle advances along the first and second rails;
   a power distribution system housed within the equipment housing operable to supply electrical power to the at least one sensor deployment motor;
   at least one first power supply cord electrically connected at a first end to the power distribution system and removably and electrically connectable to a power source in the hi-rail vehicle;
   at least one computer housed within the equipment housing and communicatively coupled to the at least one sensor deployment motor and the at least one rail sensor, the at least one computer operable to control operation of the at least one sensor deployment motor and the at least one rail sensor and to receive sensor data from the at least one rail sensor indicative of the at least one property of at least one of the first and second rails; and
   a conduit extending from the equipment housing and removably securable to a cab of the hi-rail vehicle, at least one communications cable extending through the conduit, the at least one communications cable connected at a first end to the computer and a second end of the at least one communications cable removably couplable to a display or a computer input device or both located within the cab of the hi-rail vehicle.

2. The equipment housing assembly as in claim 1 wherein the at least one computer comprises:
   at least one controller operable to control operation of the at least one sensor deployment motor and the at least one rail sensor; and
   at least one processor operable to receive and process the sensor data received from the at least one sensor.

3. The equipment housing assembly as in claim 1 wherein said power distribution system includes an inverter electrically connected to the at least one first power supply cord for converting direct current from the power source in the hi-rail vehicle to alternating current to be supplied to the at least one sensor deployment motor and further comprising a return power supply cord extending through the conduit and electrically connected at a first end to the inverter and electrically connectable at a second end to the display or the computer input device or both located within the cab of the hi-rail vehicle.

4. The equipment housing assembly as in claim 1 wherein the at least one rail sensor is retracted into the equipment housing when the sensor support is advanced to the retracted configuration.

5. The equipment housing assembly as in claim 1, wherein when the sensor support is advanced to the deployed configuration the at least one rail sensor is positioned below the equipment housing.

6. The equipment housing assembly as in claim 5, wherein said at least one rail sensor comprises at least one roller search unit and when the sensor support is advanced to the deployed configuration the at least one roller search unit is positioned to engage the first or second rail extending therebelow.

7. The equipment housing assembly as in claim 6 further comprising a fluid supply system supported at least partially within the housing assembly and configured to dispense fluid between the at least one roller search unit and the first or second rail engaged by the roller search unit.

8. The equipment housing assembly of claim 1 wherein the at least one rail sensor comprises at least one roller search unit and the sensor support on which the at least one roller search unit is mounted comprises a roller search unit support and the at least one rail sensor further comprises at least one camera mounted on a camera support, the at least one sensor deployment motor comprises a roller search unit deployment motor operably engaging the roller search unit support and the at least one sensor deployment motor further comprises a camera deployment motor operably engaging the camera support to advance the camera support between a retracted configuration relative to the equipment housing and a deployed configuration relative to the equipment housing, wherein when the camera support is advanced to the deployed configuration, the at least one camera is positioned to capture images of at least a portion of at least one of the first and second rails as the hi-rail vehicle advances along the first and second rails.

9. The equipment housing assembly as in claim 1 wherein the equipment housing includes a platform having a plurality of brackets configured for removably connecting the equipment housing to the frame of the hi-rail vehicle.

10. An equipment housing assembly removably securable to a frame of a hi-rail vehicle operable to advance along first and second rails of a railroad track, the equipment housing assembly comprising:
    an equipment housing;
    a roller search unit operable to detect defects in one of the first and second rails as the hi-rail vehicle advances along the first and second rails, the roller search unit mounted on a carriage, the carriage operably engaged by a carriage motor operable to advance the carriage between a carriage retracted position in which the roller search unit is not in contact with either of the first and second rails and a carriage deployed position in which the roller search unit is in contact with one of the first and second rails, wherein the carriage and the roller search unit mounted thereon are retracted into the equipment housing when the carriage is advanced to the carriage retracted position;
    a camera mounted on a camera mount, the camera mount operably engaged by a camera mount motor operable to advance the camera mount between a camera mount retracted position in which the camera is at least partially retracted into a camera compartment in the equipment housing and a camera mount deployed position in which the camera is advanced out of the equipment housing and is positioned to capture images of at least portions of at least one of the first and second rails as the hi-rail vehicle advances along the first and second rails;
    at least one computer housed within the equipment housing and communicatively coupled to the carriage motor and the camera mount motor, the at least one computer operable to control operation of the carriage motor, the camera mount motor, the roller search unit and the camera and to receive data from the roller search unit and the camera, the at least one computer communicatively couplable to a display or a computer input device or both located within a cab of the hi-rail vehicle.

11. The equipment housing assembly as in claim 10 wherein the at least one computer comprises:
    at least one controller operable to control operation of the carriage deployment motor, the camera mount motor, the roller search unit and the camera; and
    at least one processor operable to receive and process data received from the roller search unit and the camera.

12. The equipment housing assembly as in claim 10 further comprising:
    a power distribution system housed within the equipment housing operable to supply electrical power to the carriage motor and the camera mount motor; and
    a first power supply cord electrically connected at a first end to the power distribution system and removably and electrically connectable to a power source in the hi-rail vehicle.

13. The equipment housing assembly as in claim 12 wherein the power distribution system includes an inverter electrically connected to the first power supply cord for converting direct current from the power source in the hi-rail vehicle to alternating current to be supplied to the carriage motor and the camera mount motor and further comprising a return power supply cord extending through the equipment housing and electrically connected at a first end to the inverter and electrically connectable at a second end to the display or the computer input device or both located within the cab of the hi-rail vehicle.

14. The equipment housing assembly as in claim 10 further comprising at least one communications cable connected at a first end to the at least one computer and extending through the equipment housing and sized to extend into the cab of the hi-rail vehicle to which the equipment housing assembly is removably secured, a second end of the at least one communications cable removably couplable to the display or the computer input device or both located in the cab of the hi-rail vehicle.

15. The equipment housing assembly as in claim 14 further comprising a conduit extending from the equipment housing and removably securable to the cab of the hi-rail vehicle and the at least one communications cable extending through the conduit.

16. An equipment housing assembly removably securable to a frame of a hi-rail vehicle operable to advance along first and second rails of a railroad track, the equipment housing assembly comprising:
    an equipment housing;
    at least one rail sensor operable to sense at least one property of at least one of the first and second rails as the hi-rail vehicle advances along the first and second rails, the at least one rail sensor mounted on a sensor support;
    at least one sensor deployment motor operably engaging the sensor support and operable to advance the sensor support between a retracted configuration relative to the equipment housing and a deployed configuration relative to the equipment housing, wherein when the sensor support is advanced to the deployed configuration, the at least one sensor is positioned to sense the at least one property of at least one of the first and second rails as the hi-rail vehicle advances along the first and second rails;
    a power distribution system housed within the equipment housing operable to supply electrical power to the at least one sensor deployment motor;
    at least one first power supply cord electrically connected at a first end to the power distribution system and removably and electrically connectable to a power source in the hi-rail vehicle;
    at least one computer housed within the equipment housing, the at least one computer electrically connected to the power distribution system and communicatively coupled to the at least one sensor deployment motor and the at least one rail sensor, the at least one computer operable to control operation of the at least one sensor deployment motor and the at least one rail sensor and to receive sensor data from the at least one rail sensor indicative of the at least one property of at least one of the first and second rails; and
    a plurality of communications cables connected at a first end to the at least one computer, the plurality of communications cables extending through the equipment housing and sized to extend into a cab of the hi-rail vehicle to which the equipment housing assembly is removably secured, a second end of the plurality of communications cables removably couplable to a display and a computer input device located within the cab of the hi-rail vehicle.

17. The equipment housing assembly as in claim 16 wherein the at least one computer comprises:

at least one controller operable to control operation of the at least one sensor deployment motor and the at least one rail sensor; and at least one processor operable to receive and process the sensor data received from the at least one sensor.

18. The equipment housing assembly as in claim 16 wherein said power distribution system includes an inverter electrically connected to the at least one first power supply cord for converting direct current from the power source in the hi-rail vehicle to alternating current to be supplied to the at least one sensor deployment motor and further comprising a return power supply cord extending through the equipment housing and electrically connected at a first end to the inverter and electrically connectable at a second end to the display and the computer input device located within the cab of the hi-rail vehicle.

19. The equipment housing assembly as in claim 18 further comprising a conduit extending from the equipment housing and removably securable to a cab of the hi-rail vehicle and the plurality of communications cables and the return power supply cord extending through the conduit.

20. The equipment housing assembly of claim 19 wherein the at least one rail sensor further comprises at least one camera mounted on a camera support, the at least one sensor deployment motor further comprises a camera deployment motor operably engaging the camera support to advance the camera support between a retracted configuration relative to the equipment housing and a deployed configuration relative to the equipment housing, wherein when the camera support is advanced to the deployed configuration, the at least one camera is positioned to capture images of at least a portion of at least one of the first and second rails as the hi-rail vehicle advances along the first and second rails.

21. The equipment housing assembly as in claim 16, wherein said at least one rail sensor comprises at least one roller search unit, the sensor support comprises a carriage and the at least one sensor deployment motor comprises at least one carriage deployment motor, wherein, when the carriage is advanced to the retracted configuration by the at least one carriage deployment motor, the carriage and the at least one roller search unit supported thereon are retracted into the equipment housing above the first or second rail and when the carriage is advanced to the deployed configuration by the at least one carriage deployment motor, the at least one roller search unit is positioned to engage the first or second rail extending therebelow.

* * * * *